(12) United States Patent
Liu et al.

(10) Patent No.: US 11,333,437 B2
(45) Date of Patent: May 17, 2022

(54) REFRIGERATION UNIT WITH HEAT EXCHANGING ARRANGEMENT

(71) Applicant: Sui Liu, Guangzhou (CN)

(72) Inventors: Sui Liu, Guangzhou (CN); Zhaohui Liu, Guangzhou (CN)

( * ) Notice: Subject to any disclaimer, the term of this patent is extended or adjusted under 35 U.S.C. 154(b) by 99 days.

(21) Appl. No.: 16/896,085

(22) Filed: Jun. 8, 2020

(65) Prior Publication Data
US 2021/0071958 A1  Mar. 11, 2021

Related U.S. Application Data

(63) Continuation-in-part of application No. 16/742,893, filed on Jan. 14, 2020, now Pat. No. 10,712,049.

(30) Foreign Application Priority Data

Sep. 10, 2019  (CN) .......................... 201910850877.2
Sep. 10, 2019  (CN) .......................... 201910850878.7

(51) Int. Cl.
| F28D 3/04 | (2006.01) |
| F25B 19/04 | (2006.01) |
| F25B 25/00 | (2006.01) |
| F25B 31/00 | (2006.01) |
| F28F 25/06 | (2006.01) |
| F28F 25/00 | (2006.01) |

(52) U.S. Cl.
CPC ............... F28D 3/04 (2013.01); F25B 19/04 (2013.01); F25B 25/00 (2013.01); F25B 31/004 (2013.01); F25B 31/006 (2013.01); F28F 25/06 (2013.01); *F28F 2025/005* (2013.01)

(58) Field of Classification Search
CPC ...... F25B 1/005; F25B 41/065; F25B 39/026; F25B 41/067; F25B 2400/07
See application file for complete search history.

(56) References Cited

U.S. PATENT DOCUMENTS

| 4,252,751 A * | 2/1981 | Shito .................. G05D 23/1931 |
| | | 261/26 |
| 6,595,011 B1 * | 7/2003 | Forgy .................... F24F 5/0035 |
| | | 62/91 |

FOREIGN PATENT DOCUMENTS

| CN | 101788173 B | 8/2012 |
| CN | 206398901 U | 8/2017 |
| CN | 108895823 A | 11/2018 |

* cited by examiner

*Primary Examiner* — Henry T Crenshaw
(74) *Attorney, Agent, or Firm* — Novoclaims Patent Services LLC; Mei Lin Wong

(57) ABSTRACT

A refrigeration unit includes a compressor, a first heat exchanger, a second heat exchanger, a water pump, and a heat exchanging arrangement. The heat exchanging arrangement includes a main casing having a receiving cavity divided into a water atomizing compartment and one water showering compartment, a water atomizing unit, a water showering head, a fill material unit provided underneath the water showering head, and a water collection basin provided underneath the water atomizing unit and the fill material unit. A predetermined amount of heated water from the first heat exchanger is guided to flow to the water showering head and the water in the water showering head is sprinkled on the fill material unit. A predetermined amount of water from the water pump guided to flow to the water atomizing unit and the water flowing to the water atomizing unit is sprayed and atomized in the water atomizing compartment.

24 Claims, 19 Drawing Sheets

REFRIGERATION UNIT WITH HEAT EXCHANGING ARRANGEMENT

CROSS REFERENCE TO RELATED APPLICATION

This is a Continuation-In-Part of a non-provisional application having application number of Ser. No. 16/742,893, and filing date of Jan. 14, 2020, which claims foreign priority of Chinese patent application number 201910850878.7 and filing date 2019-09-10. This non-provisional application also claims foreign priority of Chinese patent application number 201910850877.2 and filing date 2019-09-10. The entire contents of these applications are hereby incorporated by reference.

BACKGROUND OF THE PRESENT INVENTION

Field of Invention

The present invention relates to a refrigeration system, and more particularly to a refrigeration unit which comprises a heat exchanging arrangement, wherein ambient air is pre-cooled by allowing atomized water to be partially evaporated so as to enhance an effectiveness and efficiency of heat exchange performance between ambient air and water as a heat exchange medium.

Description of Related Arts

A conventional refrigeration system or unit may utilize a heat exchanging arrangement for cooling heat exchange medium, such as heated water. The conventional water tower is usually located in an outdoor environment so that ambient air may be drawn to the heat exchanging arrangement for cooling heated water. A deep-seated problem for conventional heat exchanging arrangements as mentioned above is that they generally suffer from fairly low heat exchange efficiency. The situation becomes worse when the air quality of the ambient air is not very good. Thus, there is a need to develop an air conditioning and heat pump system with a more energy efficient heat exchanging arrangement.

SUMMARY OF THE PRESENT INVENTION

An objective of the present invention is to provide a refrigeration unit which comprises a heat exchanging arrangement, wherein ambient air is pre-cooled by allowing atomized water to be partially evaporated so as to enhance an effectiveness and efficiency of heat exchange performance between ambient air and water as a heat exchange medium.

Another objective of the present invention is to provide a refrigeration unit which can be selectively operated as an air conditioning system or a heat pump system.

Another objective of the present invention is to provide a refrigeration unit which comprises a heat exchanging arrangement, wherein when the refrigeration unit works as an air conditioning system, the heat exchanging arrangement is capable of enhancing heat exchange performance between ambient air and water as heat exchange medium.

Another objective of the present invention is to provide a refrigeration unit which comprises a heat exchanging arrangement, wherein when the refrigeration unit works as a heat pump system, the heat exchanging arrangement is capable of preventing water from substantial freezing.

In one aspect of the present invention, it provides a refrigeration unit, comprising:

a plurality of connecting pipes for allowing heat exchange medium to pass therethrough;

a compressor having a compressor input port and a compressor output port;

a first heat exchanger connected to the compressor through at least one of the connecting pipes, the first heat exchanger having a first connection port, a second connection port, a second heat exchanger connected to the compressor and the first heat exchanger through at least one of the connecting pipes, the second heat exchanger having a third connection port and a fourth connection port;

a heat transfer fan communicated with the second heat exchanger for drawing air to perform heat exchange with the heat exchange medium flowing through the second heat exchanger;

a water pump having a water input port and a water output port, the water output port being connected to the water inlet of the first heat exchanger; and a heat exchanging arrangement, which comprises:

a main casing having a receiving cavity divided into at least one water atomizing compartment and one water showering compartment, an air inlet communicating with the water atomizing compartment of the receiving cavity, and an air outlet communicating with the water showering compartment of the receiving cavity;

a fan provided in the main casing for drawing ambient air to enter the main casing through the air inlet and exit the main casing through the air outlet;

at least one water atomizing unit provided on the water atomizing compartment and connected to the water output port of the water pump through at least one of the connecting pipes;

at least one water showering head provided on the water showering compartment and connected to the water outlet of the first heat exchanger;

at least one fill material unit provided underneath the water showering head; and a water collection basin provided underneath the water atomizing unit and the fill material, wherein a predetermined amount of heated water in the first heat exchanger is arranged to be guided to flow to the water showering head through the water outlet and through at least one of the connecting pipes, the water in the water showering head being sprinkled on the fill material unit and collected in the water collection basin, wherein a predetermined amount of water from the water output port of the water pump is guided to flow to the water atomizing unit through at least one of the connecting pipes, the water flowing to the water atomizing unit being sprayed and atomized in the water atomizing compartment, the ambient air being drawn to sequentially pass through the water atomizing compartment and the water showering compartment to cool down a temperature of the water in the water showering compartment, the water collected in the water collection basin being guided to flow into the water pump through the water input port and at least one of the connecting pipes.

In another aspect of the present invention, it provides a refrigeration unit, comprising:

a plurality of connecting pipes for allowing heat exchange medium to pass therethrough;

a compressor having a compressor input port and a compressor output port;

a four-way reversing valve connected to the compressor through the connecting pipes;

a first heat exchanger connected to the compressor through the four-way reversing valve and at least one of the connecting pipes, the first heat exchanger having a first connection port, a second refrigerator port, a water inlet and a water outlet;

a second heat exchanger connected to the compressor and the first heat exchanger through at least one of the connecting pipes, the second heat exchanger having a third connection port and a fourth connection port;

a heat transfer fan communicated with the second heat exchanger for drawing air to perform heat exchange with the heat exchange medium flowing through the second heat exchanger;

a water pump having a water input port and a water output port, the water output port being connected to the water inlet of the first heat exchanger; and a heat exchanging arrangement, which comprises:

a main casing having a receiving cavity divided into at least one water atomizing compartment and one water showering compartment, an air inlet communicating with the water atomizing compartment of the receiving cavity, and an air outlet communicating with the water showering compartment of the receiving cavity;

a fan provided in the main casing for drawing ambient air to enter the main casing through the air inlet and exit the main casing through the air outlet;

at least one water atomizing unit provided on the water atomizing compartment and connected to the water output port of the water pump through at least one of the connecting pipes;

at least one water showering head provided on the water showering compartment and connected to the water outlet of the first heat exchanger;

at least one fill material unit provided underneath the water showering head; and a water collection basin provided underneath the water atomizing unit and the fill material, wherein a predetermined amount of water in the first heat exchanger is arranged to be guided to flow to the water showering head through the water outlet and through at least one of the connecting pipes, the water in the water showering head being sprinkled on the fill material unit and collected in the water collection basin, wherein a predetermined amount of water from the water output port of the water pump is guided to flow to the water atomizing unit through at least one of the connecting pipes, the water flowing to the water atomizing unit being sprayed and atomized in the water atomizing compartment, the ambient air being drawn to sequentially pass through the water atomizing compartment and the water showering compartment, the water collected in the water collection basin being guided to flow into the water pump through the water input port and at least one of the connecting pipes.

This summary presented above is provided merely to introduce certain concepts and not to identify any key or essential features of the claimed subject matter.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

Figure 1:
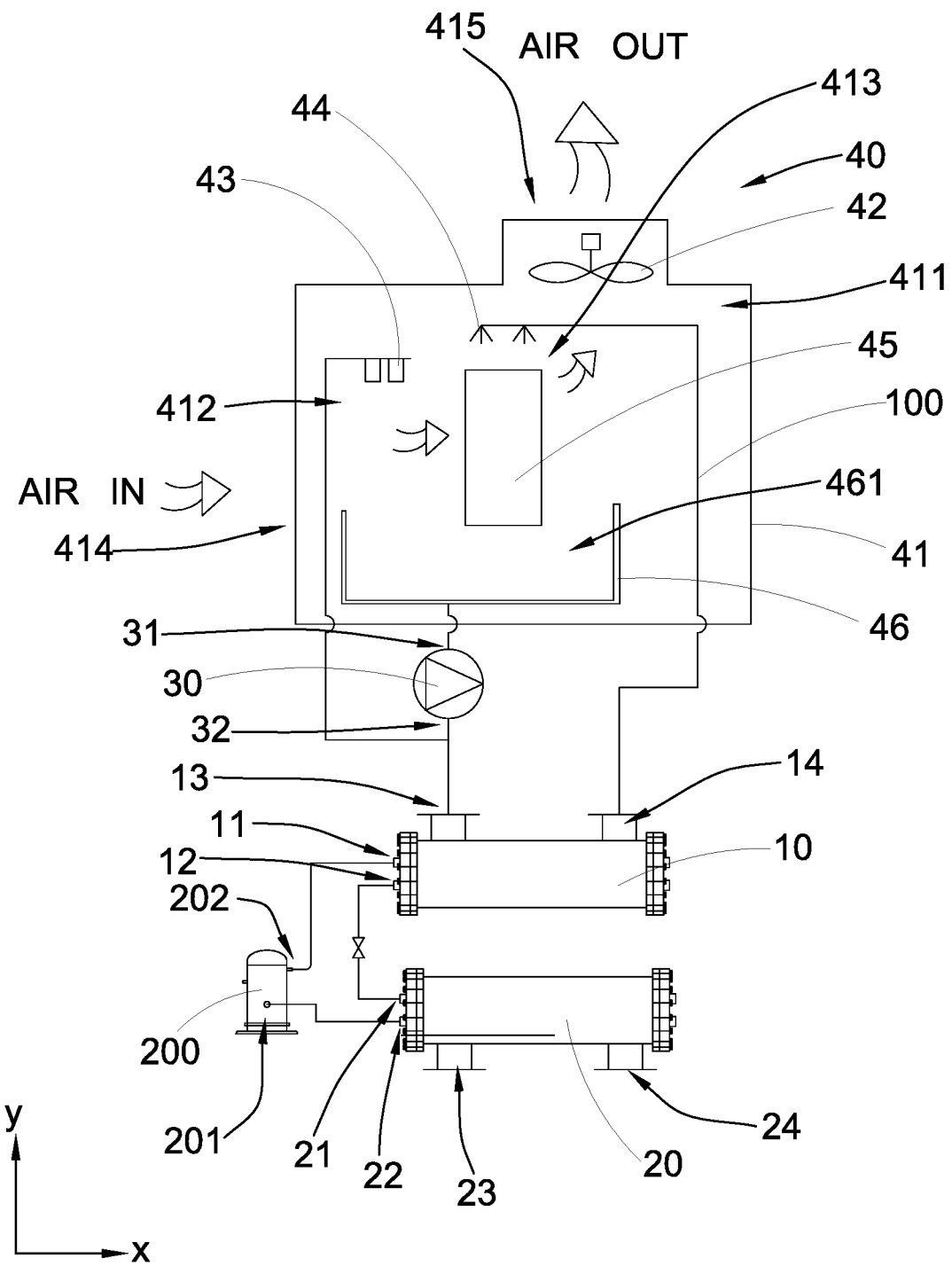
FIG. 1 is a schematic diagram of a refrigeration unit according to a first preferred embodiment of the present invention.
Figure 2:
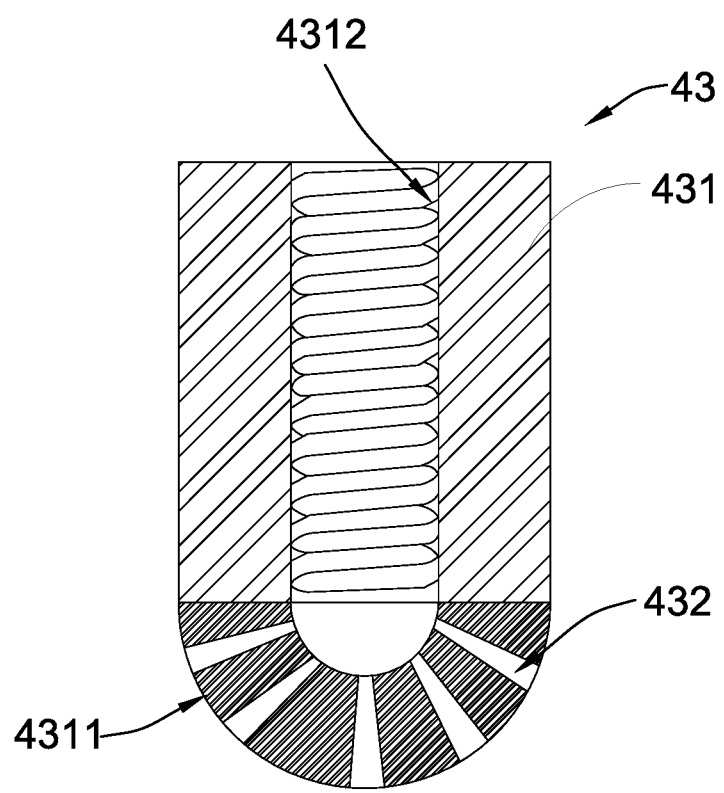
FIG. 2 is a schematic diagram of a water atomizing unit of a heat exchanging arrangement of the refrigeration unit according to the first preferred embodiment of the present invention.

Referring to FIG. 1 to FIG. 2 of the drawings, a refrigeration unit according to a first preferred embodiment of the present invention is illustrated. Broadly, the refrigeration unit comprises a plurality of connecting pipes 100, a compressor 200, a first heat exchanger 10, a second heat exchanger 20, a water pump 30, and a heat exchanging arrangement 40. The plurality of connecting pipes 100 are for allowing heat exchange medium to pass therethrough, so that heat exchange medium, such as refrigerant or water may pass through the elements of the refrigeration unit. In the description below, the connections between various elements of the refrigeration unit are carried out by at least one connecting pipe 100.

The first heat exchanger 10 is connected to the compressor 200 through at least one of the connecting pipes 100. The first heat exchanger 10 has a first connection port 11, a second connection port 12, a water inlet 13 and a water outlet 14.

The second heat exchanger 20 is connected to the compressor 200 and the first heat exchanger 10 through at least one of the connecting pipes 100. The second heat exchanger 20 has a third connection port 21 and a fourth connection port 22.

The water pump 30 has a water input port 31 and a water output port 32, wherein the water output port 32 is connected to the water inlet 13 of the first heat exchanger 10.

The heat exchanging arrangement 40 comprises a main casing 41, a fan 42, at least one water atomizing unit 43, at least one water showering head 44, at least one fill material unit 45, and a water collection basin 46.

The main casing 41 has a receiving cavity 411 divided into at least one water atomizing compartment 412 and one water showering compartment 413, an air inlet 414 communicating with the water atomizing compartment 412 of the receiving cavity 411, and an air outlet 415 communicating with the water showering compartment 413 of the receiving cavity 411.

The fan 42 is provided in the main casing 41 for drawing ambient air to enter the main casing 41 through the air inlet 414 and exit the main casing 41 through the air outlet 415.

The water atomizing unit 43 is provided in the water atomizing compartment 412 and connected to the water output port 32 of the water pump 30 through at least one of the connecting pipes 100.

The water showering head 44 is provided in the water showering compartment 413 and connected to the water outlet 14 of the first heat exchanger 10. The fill material unit 45 is provided underneath the water showering head 44.

The water collection basin 46 has a collection cavity 461 and is provided underneath the water atomizing unit 43 and the fill material unit 45. With the above configuration, a predetermined amount of heated water in the first heat exchanger 10 is arranged to be guided to flow to the water showering head 44 through the water outlet 14 and through at least one of the connecting pipes 100. The water in the water showering head 44 may be sprinkled on the fill material unit 45 and collected in the water collection basin 46.

A predetermined amount of water from the water output port 32 of the water pump 30 is guided to flow to the water atomizing unit 43 through at least one of the connecting pipes 100. The water flowing to the water atomizing unit 43 is finely sprayed and atomized in the water atomizing compartment 412.

On the other hand, the ambient air is being drawn to sequentially pass through the water atomizing compartment 412 and the water showering compartment 413 to cool down a temperature of the water in the water showering compartment 413. The water collected in the water collection basin 46 is guided to flow into the water pump 30 through the water input port 31 and at least one of the connecting pipes 100.

According to the first preferred embodiment of the present invention, the refrigeration unit is utilized to produce cooled air in a designated space (i.e. an air conditioning system). A predetermined of heat exchange medium, such as refrigerant, is guided to pass through the connecting pipes 100 so as to extract and retrieve heat from another heat exchange medium, such as refrigerant or water.

Referring to FIG. 1 of the drawings, the compressor 200 has a compressor input port 201 and a compressor output port 202, wherein refrigerant is arranged to enter the compressor 200 through the compressor input port 201 and leave the compressor 200 through the compressor output port 202.

The compressor output port 202 is connected to the first connection port 11 of the first heat exchanger 10. The compressor input port 201 is connected to the fourth connection port 22 of the second heat exchanger 20. The second connection port 12 of the first heat exchanger 10 is connected to the third connection port 21 of the second heat exchanger 20. The second heat exchanger 20 further has a fifth connection port 23 and a sixth connection port 24 connected to an indoor system (not shown in the drawings) for extracting heat therefrom.

A predetermined amount of refrigerant may circulate between the first heat exchanger 10, the compressor 200, and the second heat exchanger 20. At the same time, water may circulate between the heat exchanging arrangement 40 and the first heat exchanger 10. The heat exchanging arrangement 40 in the first preferred embodiment may be configured to extract heat from the water to ambient air.

The main casing 41 of the heat exchanging arrangement 40 is partitioned into the water atomizing compartment 412 and the water showering compartment 413. As shown in FIG. 1 of the drawings, the water atomizing compartment 412 and the water showering compartment 413 are formed in a side-by-side manner so that ambient air drawn from the air inlet 414 is arranged to first pass through the water atomizing compartment 412 and then the water showering compartment 413. In other words, the water atomizing compartment 412 and the water showering compartment 413 communicate with each other.

The heat exchanging arrangement 40 comprises a plurality of water atomizing units 43 connected to the water output port 32 of the water pump 30. The water atomizing units 43 are arranged to atomize the water supplied to the water atomizing units 43 into very fine droplets. Atomized water is then arranged to be disposed or guided to accommodate in the water atomizing compartment 412. The atomized water may eventually be collected in the water collection basin 46 provided underneath the water atomizing units 43.

On the other hand, the heat exchanging arrangement 40 comprises a plurality of water showering heads 44. The water showering heads 44 are connected to the water outlet 14 of the first heat exchanger 14. Heated water from the first heat exchanger 14 is guided to flow to the water showering heads 44 which are arranged to produce a spray of water (as opposed to atomized water) on the fill material unit 45 provided there underneath.

Note that the difference between the spray of water or atomization of water is that in the former, a stream of water is broken down into very fine particles while in the latter, a stream of water is merely diverted to form a spray or showering of water without water being transformed into very fine particles or droplets. It works as sprinkling of water onto the fill material unit 45.

The water sprinkled on the fill material unit 45 is arranged to form a thin film of water flow along a vertical direction of the fill material unit 45 so as to increase heat exchange surface area between the water film and the ambient air. Eventually, the water in the fill material unit 45 is guided to flow downwardly along the fill material unit 45 and drop into the water collection basin 46 provided underneath the fill material unit 45. Thus, a transverse direction (x-direction as shown in FIG. 1) of the water collection basin 46 extend across a transverse direction of the water atomizing compartment 412 and the water showering compartment 413.

According to the first preferred embodiment of the present invention, the fill material unit 45 may be conventional fill material used in air conditioning area and may be configured from plastic material, aluminum, or stainless steel. The fill material unit 45 may comprise a plurality of elongated thin members, wherein the elongated thin members are closely placed and have flat, corrugated or textured heat exchange surface. The heat exchange surfaces can allow water to flow along so that when ambient air passes through the fill material unit, heat exchange takes place between the ambient air and the water flowing through the fill material unit 45.

The fan 42 is provided in the main casing 41 in the vicinity of the air outlet 415. The fan 42 may be driven to draw ambient air from the air inlet 414, in which the ambient air will be guided to sequentially pass through the water atomizing compartment 412, the water showering compartment 413 and eventually discharge out of the main casing 41 through the air outlet 415. As shown in FIG. 1 of the drawings, the air outlet 415 and the fan 42 are positioned above the water showering heads 44 and above the water showering compartment 413.

Figure 4:
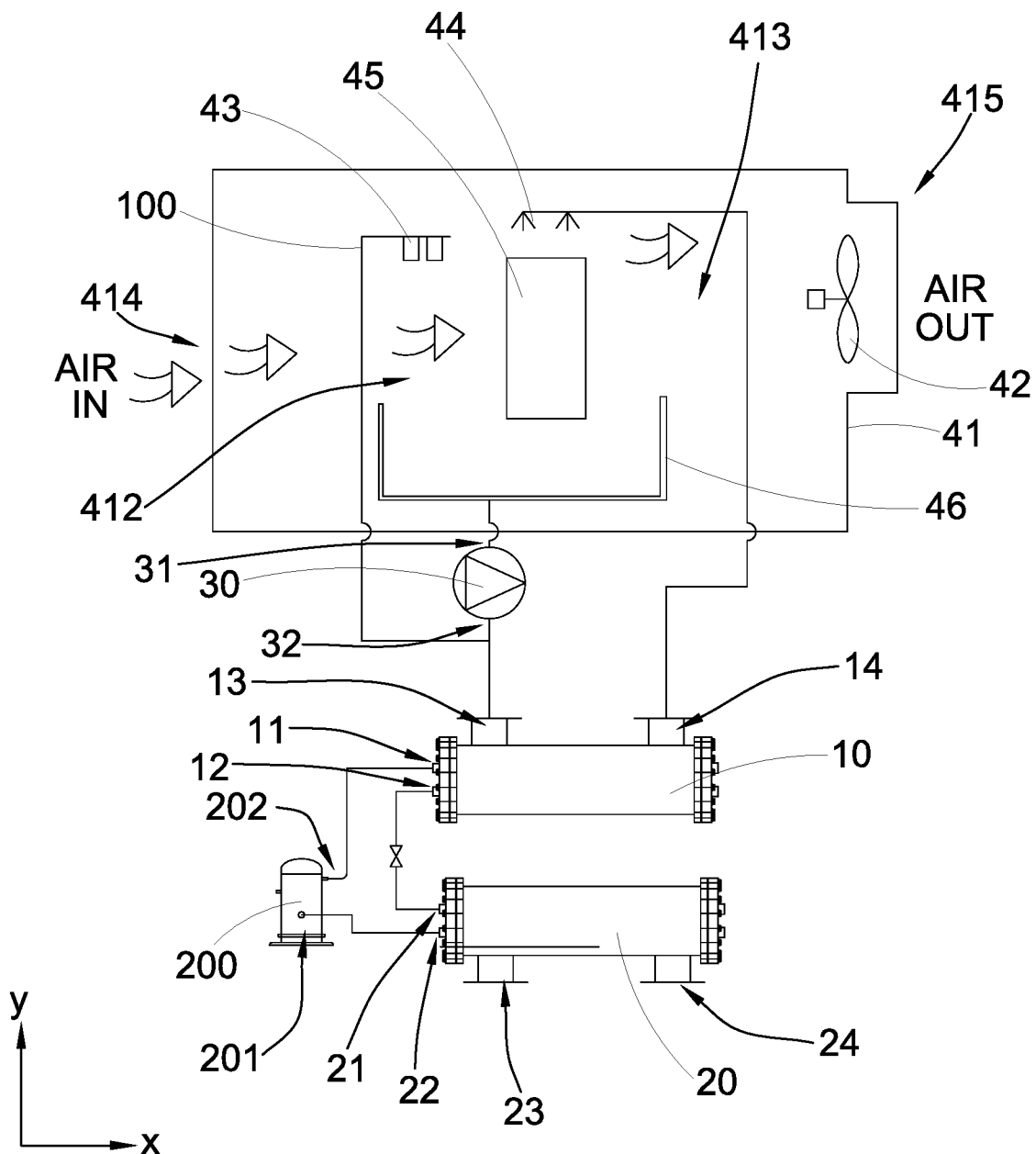
FIG. 4 is an alternative installation configuration of a fan of the heat exchanging arrangement of the refrigeration unit according to the first preferred embodiment of the present invention.

It should be understood that the fan 42 may be installed or connected in other positions so as to fit different operational circumstances of the present invention. For example, as shown in FIG. 4 of the drawings, the fan 42 and the air outlet 415 may be provided on one side (such as right side) of the water showering compartment 413 so that ambient air may be drawn to sequentially flow from the air inlet 414, the water atomizing compartment 412, the water showering compartment 413, the fan 42, and the air outlet 415 in a left-to-right direction.

Referring to FIG. 2 of the drawings, each of the water atomizing units 43 comprises a main body 431 having a hollow cylindrical structure and a plurality of atomizing channels 432 evenly extending on a bottom portion 4311 of the main body 431 for allowing water to pass through. Each of the atomizing channels 432 has a gradually increasing diameter from a top to bottom so as to atomize water pass through the main body 431. Each of the main body 431 has a bored inner sidewall 4312 for allowing the water atomizing unit 43 to be attached on an external object.

The operation of the present invention is as follows: a predetermined amount of refrigerant may be guided to start an air conditioning cycle from the compressor 200. Refrigerant may leave the compressor 200 through the compressor output port 202 and enter the first heat exchanger 10 through the first connection port 11. The refrigerant entering the first heat exchanger 10 may perform heat exchange with the water circulating between the heat exchanging arrangement 40 and the first heat exchanger 10, in such a manner that heat in the refrigerant is extracted to the water circulating between the heat exchanging arrangement 40 and the first heat exchanger 10 (the mechanism in which the heat in the water is extracted by the heat exchanging arrangement will be described below).

The refrigerant will then be guided to leave the first heat exchanger 10 through the second connection port 12 and enter the second heat exchanger 20 through the third heat refrigerant port 21. The refrigerant entering the second heat exchanger 20 will then be arranged to perform heat exchange with another heat exchange medium (indoor heat exchange medium), such as another stream of refrigerant, and absorb heat therefrom. The indoor heat exchange medium will then be arranged to enter designated indoor space to lower a temperature thereof. The refrigerant having absorbed heat from the indoor heat exchange medium will then be guided to exit the second heat exchanger 20 through the fourth connection port 22. The heated refrigerant will eventually be guided to flow back to the compressor 200 through the compressor input port 201 to complete an air conditioning cycle.

On the other hand, water circulating in the first heat exchanger 10 is guided to leave the first heat exchanger 10 through the water outlet 14 and flow to the water showering heads 44. The water flowing to the water showering heads 44 is arranged to be sprinkled or sprayed on the fill material unit 45 and form a thin film therein. The water flowing along the fill material unit 45 is arranged to perform heat exchange with the ambient air passing through the fill material unit 45. The water in the fill material unit 45 will be cooled down by the flow of ambient air and collected in the water collection basin 46. The water collected in the water collection basin 46 is pumped back to the first heat exchanger 10 by the water pump 30.

The flow of water exiting the water pump 30 is bifurcated into two streams. One of the streams is guided to enter the first heat exchanger 10 through the water inlet 13 for performing heat exchange with the refrigerant in the manner described above. Another stream or branch of the water is guided to flow back to the heat exchanging arrangement 40 and reach the water atomizing units 43. The water reaching the water atomizing units 43 is arranged to be atomized and released to the water atomizing compartment 412. The very tiny water mist is arranged to evaporate in the water atomizing compartment 412 and pre-cool the ambient air drawn from the air inlet 414. In this way, the temperature of the ambient air entering the water showering compartment 413 will be substantially lowered. The difference in temperature between the water spraying in the water showering compartment 413 and the ambient air will be substantially increase and this substantial increase in temperature difference allows substantial increase in heat exchange effectiveness and efficiency between the ambient air and the thin film of water flowing in the fill material unit 45.

It is worth mentioning that the stream of water flowing to the water atomizing units 43 can be driven by a pressure differential (typically in the range of 70 KPa-150 KPa) between the water inlet 13 of the first heat exchanger 10 and the water atomizing units 43 so that no additional energy is needed to atomize the water flowing to the water atomizing units 43.

Figure 3:
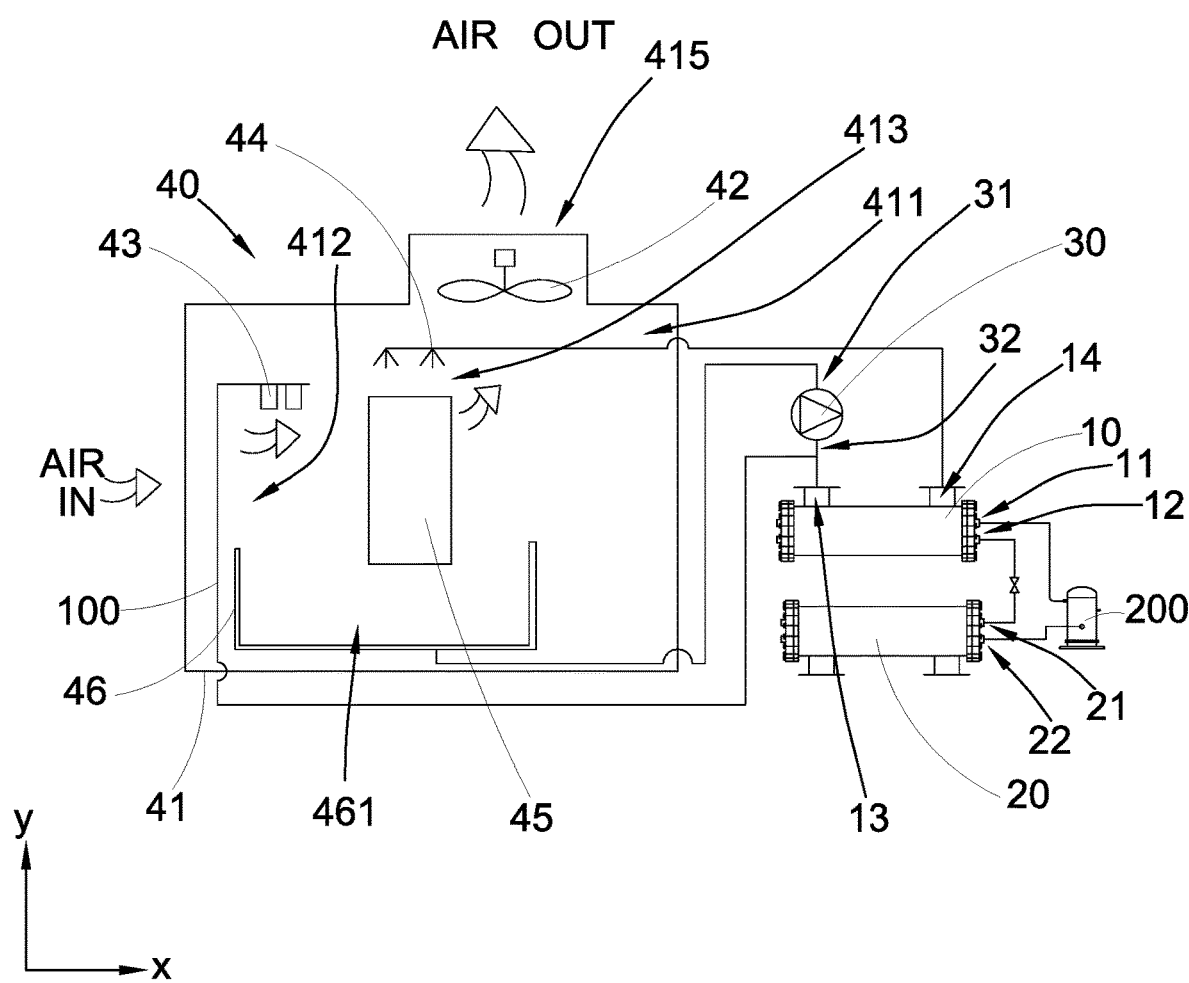
FIG. 3 is an alternative configuration of the refrigeration unit according to the first preferred embodiment of the present invention.

In addition, the configuration of the first heat exchanger 10, the second heat exchanger 20, the water pump 30, and the heat exchanging arrangement 40 may be varied depending on the circumstances in which the present invention is implemented. As shown in FIG. 1 of the drawings, the first heat exchanger 10, the second heat exchanger 20, the water pump 30 and the heat exchanging arrangement 40 may be installed in a top-down approach (i.e. vertical configuration)

in which the heat exchanging arrangement 40 is positioned physically above the first heat exchanger 10 and the second heat exchanger 20. Alternatively, as shown in FIG. 3 of the drawings, the heat exchanging arrangement 40 may be positioned at one side of the first heat exchanger 10 and the second heat exchanger 20 (i.e. side-by-side configuration).

Figure 5:
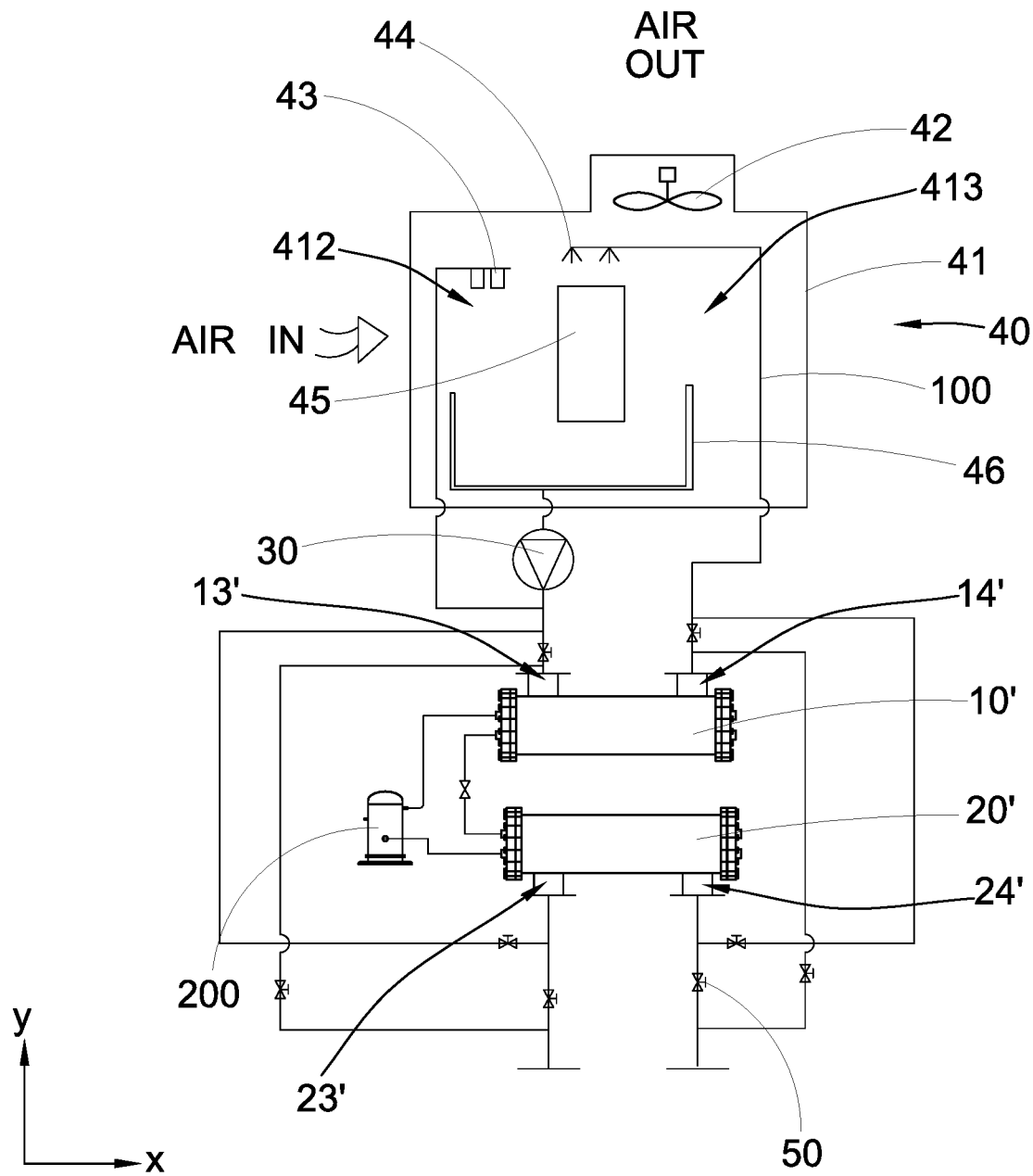
FIG. 5 is a first alternative mode of the refrigeration unit according to the first preferred embodiment of the present invention.

Referring to FIG. 5 of the drawings, a first alternative mode of the refrigeration unit according to the first preferred embodiment of the present invention is illustrated. The first alternative mode is similar to the first preferred embodiment, except the connection between the second heat exchanger 20' and the heat exchanging arrangement 40. According to the first alternative mode, the fifth connection port 23' is also connected to the water output port 32 of the water pump 30 and the water inlet 13' of the first heat exchanger 10' through a plurality of connecting pipes 100 in two separate piping branches respectively. Moreover, the sixth connection port 24' is also connected to the water outlet 14' through a plurality of connecting pipes 100 also in two separate piping branches respectively.

The refrigeration unit further comprises a plurality of control valves 50' provided in the connecting pipes 100 for adjusting a flow of refrigerant or water passing through the relevant connecting pipes 100 and the control valves 50'. With the configuration shown in FIG. 5, a user of the present invention may be able to control different flow path of the refrigerant or water for achieving different air conditioning effects.

Figure 6:
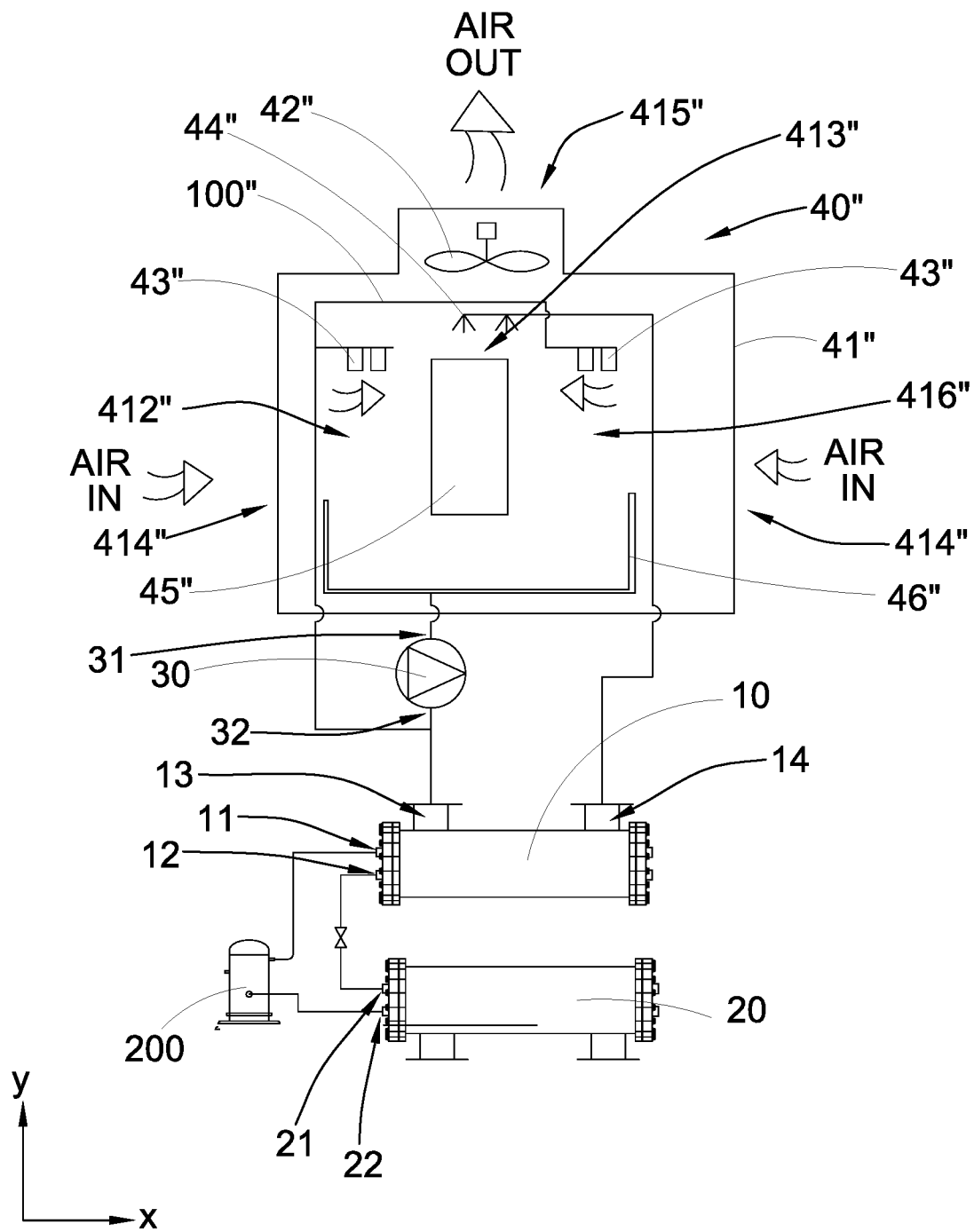
FIG. 6 is a second alternative mode of the refrigeration unit according to the first preferred embodiment of the present invention.

Referring to FIG. 6 of the drawings, a second alternative mode of the refrigeration unit according to the first preferred embodiment of the present invention is illustrated. The second alternative mode is similar to the first preferred embodiment, except the heat exchanging arrangement 40". According to the second alternative mode, the main casing 41" further has a second water atomizing compartment 416". For the sake of clarification, the water atomizing compartment 412 described in the first preferred embodiment above will be referred to as first atomizing compartment 412", whereas the newly introduced atomizing compartment will be referred to as second atomizing compartment 416". The second atomizing compartment 416" is provided adjacent to the water showering compartment 413" at an opposite side of the first water atomizing compartment 412". In other words, the water showering compartment 413" is sandwiched between the first water atomizing compartment 412" and the second atomizing compartment 416". Thus, the first water atomizing compartment 412" and the second atomizing compartment 416" are provided at two opposing sides of the water showering compartment 413".

In the second alternative mode, the main casing 41" has two air inlets 414" provided one two sides of the main casing 41", wherein ambient air may be drawn to enter the first water atomizing compartment 412" and the second atomizing compartment 416" through the two air inlets 414" respectively. Some of the water atomizing units 43" are provided in the first water atomizing compartment 412" and the second atomizing compartment 416" for atomizing water coming from the water output port 32 of the water pump 30. The water atomizing units 43" in the first water atomizing compartment 412" and the second atomizing compartment 416" are connected in parallel through connecting pipes 100". Thus, water from the water output port 32 of the water pump 30 will be guided to flow to the water atomizing units 43" in the first water atomizing compartment 412" and the second atomizing compartment 416".

As shown in FIG. 6 of the drawings, the water collection basin 46" are provided underneath the water showering heads 44" and the fill material unit 45" in which a transverse direction (x-direction as shown in FIG. 6) of the water collection basin 46" extends across the first water atomizing compartment 412" and the second atomizing compartment 416", as well as the water showering compartment 413".

The air outlet 415" and the fan 42" are provided on a top portion of the main casing 41" at a position above the first water atomizing compartment 412", the second atomizing compartment 416" and the water showering compartment 413". Ambient air is drawn by the fan 42" to enter the main casing 41" through the air inlets 414" provided on two sides of the main casing 41". The ambient air will then be guided to pass through the first water atomizing compartment 412" and the second atomizing compartment 416". Ambient air leaving the first water atomizing compartment 412" and the second atomizing compartment 416" will be guided to enter the water showering compartment 413" to perform heat exchange with the water flowing along the fill material unit 45". The air will then be drawn to leave the main casing 41" at a top portion thereof through the air outlet 415".

Figure 7:
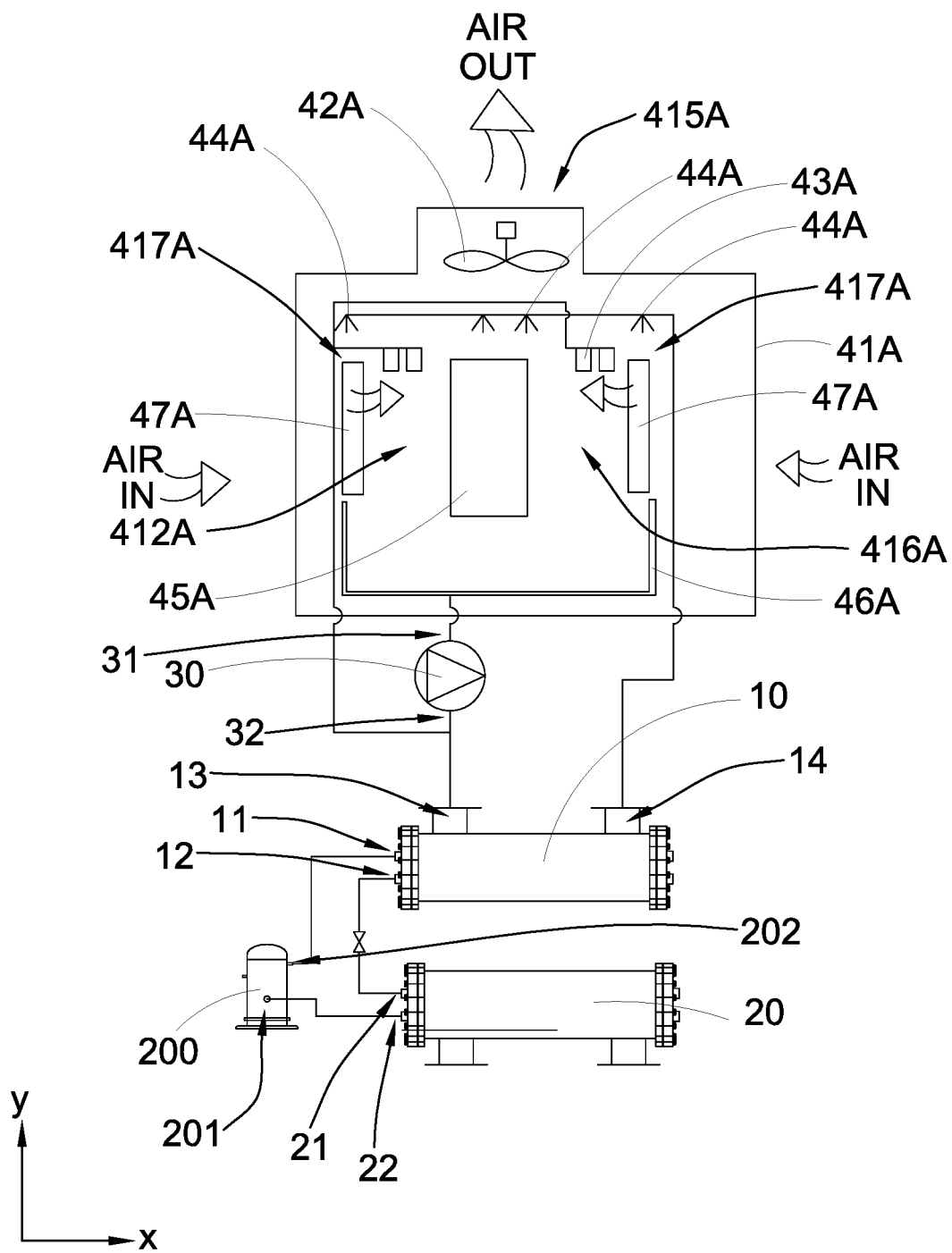
FIG. 7 is a third alternative mode of the refrigeration unit according to the first preferred embodiment of the present invention.

Referring to FIG. 7 of the drawings, a third alternative mode of the refrigeration unit according to the first preferred embodiment of the present invention is illustrated. The third alternative mode is a modification to the second alternative mode of the first preferred embodiment described above. According to the third alternative mode, the main casing 41A further has two auxiliary water showering compartments 417A formed adjacent to an outer side of the first water atomizing compartment 412A and the second water atomizing compartment 416A respectively. Ambient air drawn into the main casing 41A will be guided to first pass through the two auxiliary water showering compartments 417A before reaching the first water atomizing compartment 412A and the second water atomizing compartment 416A.

The heat exchanging arrangement 40A further comprises a plurality of auxiliary fill material units 47A provided in the auxiliary water showering compartments 417A respectively, wherein at least two of the water showering heads 44A are provided above the auxiliary fill material units 47A respectively for sprinkling or showering water on the corresponding auxiliary fill material units 47A.

The water showering in the auxiliary water showering compartment 417A serves to prevent atomized water from escaping from the first water atomizing compartment 412A and the second water atomizing compartment 416A so as to allow the maximize amount of atomized water to evaporate in the first water atomizing compartment 412A and the second water atomizing compartment 416A for lowering the temperature of the ambient air. Note that all of the water showering heads 44A are connected to the water outlet 14 of the first heat exchanger 10.

Moreover, the water collection basin 46A are provided underneath the water atomizing units 43A, the fill material unit 45A and the auxiliary fill material units 47A in which a transverse direction (x-direction as shown in FIG. 7) of the water collection basin 46A extends across a transverse direction of the auxiliary water showering compartments 417A, the first water atomizing compartment 412A the second atomizing compartment 416A, as well as the water showering compartment 413A.

The water atomizing units 43A in the first water atomizing compartment 412A and the second atomizing compartment 416A are connected in parallel through connecting pipes 100A. Water from the water output port 32 of the water pump 30 will be guided to flow to the water atomizing units 43A in the first water atomizing compartment 412A and the second atomizing compartment 416A. Ambient air is drawn from the air inlets 414A at two sides of the main casing 41A to the air outlet 415A at the top portion of the main casing by operation of the fan 42A.

Figure 8:
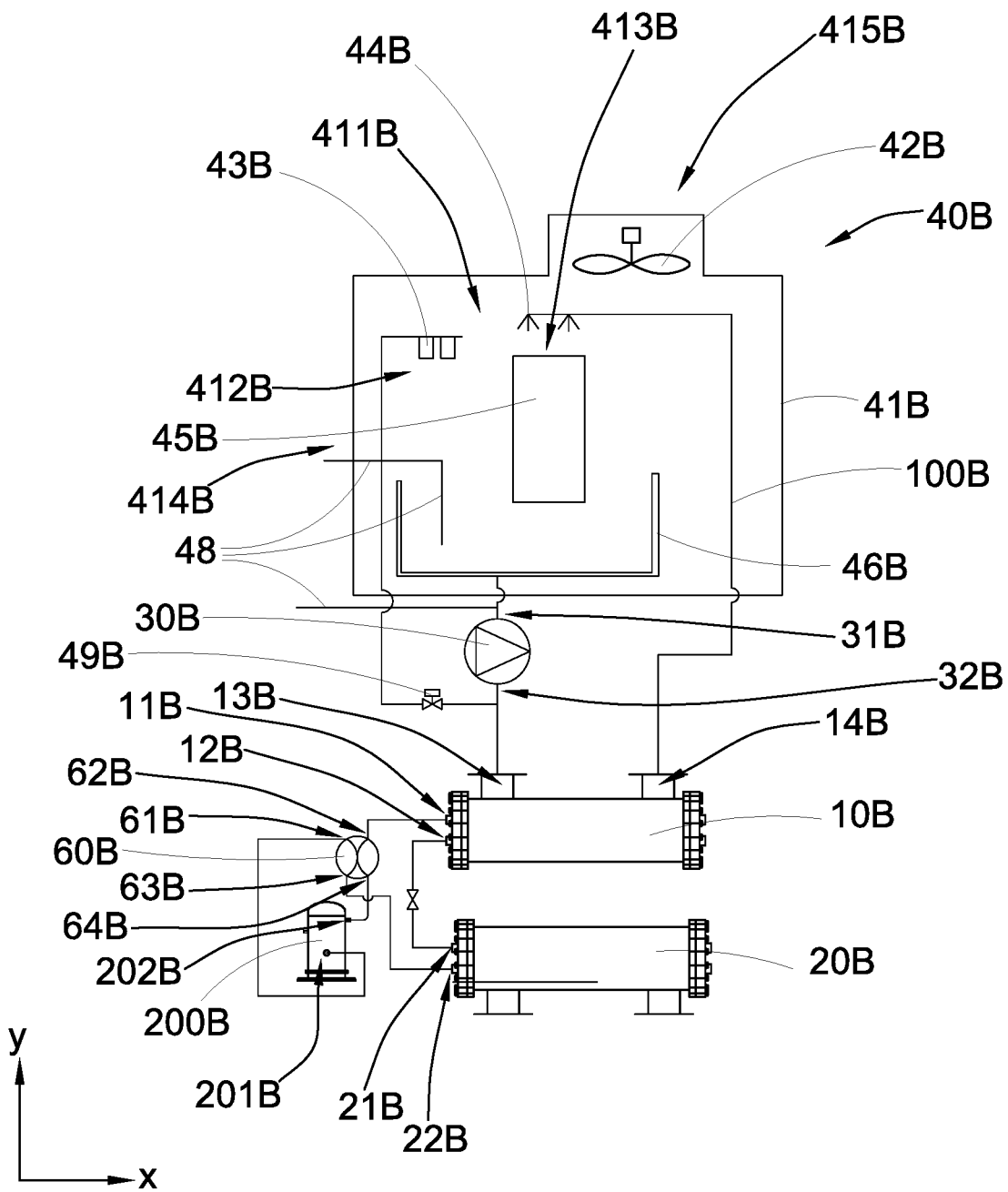
FIG. 8 is a schematic diagram of a refrigeration unit according to a second preferred embodiment of the present invention.

Referring to FIG. 8 of the drawings, a refrigeration unit according to a second preferred embodiment of the present invention is illustrated. Broadly, the refrigeration unit comprises a plurality of connecting pipes 100B, a compressor 200B, a first heat exchanger 10B, a second heat exchanger 20B, a water pump 30B, a four-way reversing valve 60B and a heat exchanging arrangement 40B. The plurality of connecting pipes 100B are for allowing heat exchange medium to pass therethrough, so that heat exchange medium, such as refrigerant or water may pass through the elements of the refrigeration unit. In the second preferred embodiment, the refrigeration unit may be selectively used as producing cooled air or heated air (i.e. an air conditioning and heat pump system).

The first heat exchanger 10B is connected to the compressor 200B through at least one of the connecting pipes 100B and the four-way reversing valve 60B. The first heat exchanger 10B has a first connection port 11B, a second refrigerator port 12B, a water inlet 13B and a water outlet 14B.

The second heat exchanger 20B is connected to the compressor 200B and the first heat exchanger 10B through at least one of the connecting pipes 100B and the four-way reversing valve 60B. The second heat exchanger 20B has a third connection port 21B and a fourth connection port 22B.

The water pump 30B has a water input port 31B and a water output port 32B, wherein the water output port 32B is connected to the water inlet 13B of the first heat exchanger 10B.

The heat exchanging arrangement 40B comprises a main casing 41B, a fan 42B, at least one water atomizing unit 43B, at least one water showering head 44B, at least one fill material unit 45B, and a water collection basin 46B.

The main casing 41B has a receiving cavity 411B divided into at least one water atomizing compartment 412B and one water showering compartment 413B, an air inlet 414B communicating with the water atomizing compartment 412B of the receiving cavity 411B, and an air outlet 415B communicating with the water showering compartment 413B of the receiving cavity 411B.

The fan 42B is provided in the main casing 41B for drawing ambient air to enter the main casing 41B through the air inlet 414B and exit the main casing 41 through the air outlet 415B.

The water atomizing unit 43B is provided on the water atomizing compartment 412B and connected to the water output port 32B of the water pump 30B through at least one of the connecting pipes 100B.

The water showering head 44B is provided on the water showering compartment 413 and is connected to the water outlet 14B of the first heat exchanger 10B. The fill material unit 45B is provided underneath the water showering head 44B.

The water collection basin 46B is provided underneath the water atomizing unit 43 and the fill material unit 45B. With the above configuration, a predetermined amount of water in the first heat exchanger 10B is arranged to be guided to flow to the water showering head 44B through the water outlet 14B and through at least one of the connecting pipes 100B. The water in the water showering head 44B may be sprinkled on the fill material unit 45B and collected in the water collection basin 46B.

A predetermined amount of water from the water output port 32B of the water pump 30B is guided to flow to the water atomizing unit 43B through at least one of the connecting pipes 100B. The water flowing to the water atomizing unit 43B is atomized in the water atomizing compartment 412B.

On the other hand, the ambient air is being drawn to sequentially pass through the water atomizing compartment 412B and the water showering compartment 413B to perform heat exchange with the water in the water showering compartment 413B. The water collected in the water collection basin 46B is guided to flow into the water pump 30B through the water input port 31 and at least one of the connecting pipes 100B.

According to the second preferred embodiment of the present invention, the refrigeration unit can be utilized to act as an air conditioning system or a heat pump system. A predetermined of heat exchange medium, such as refrigerant, is guided to pass through the connecting pipes 100B so as to extract and retrieve heat from another heat exchange medium, such as refrigerant or water.

Referring to FIG. 8 of the drawings, the compressor 200B has a compressor input port 201B and a compressor output port 202B, wherein refrigerant is arranged to enter the compressor 200B through the compressor input port 201B and leave the compressor 200 through the compressor output port 202B.

The four-way reversing valve 60B has first through fourth communicative port 61B, 62B, 63B, 64B, and may be selectively switched between an air conditioning mode and a heat pump mode, wherein in the air conditioning mode, the first communicative port 61B is connected to the third communicative port 63B, while the second communicative port 62B is connected to the fourth communicative port 64B. In the heat pump mode, the four-way reversing valve 60B is switched so that the first communicative port 61B is connected to second communicative port 62B while the third communicative port 63B is connected to the fourth communicative port 64B.

The compressor input port 201B is connected to the first communicative port 61B of the four-way reversing valve 60B. The compressor output port 202B is connected to the fourth communicative port 64B of the four-way reversing valve 60B.

Moreover, the first connection port 11B of the first heat exchanger 10B is connected to the second communicative port 62B of the four-way reversing valve 60B. The fourth connection port 22B of the second heat exchanger 20B is connected to the third communicative port 63B of the four-way reversing valve 60B. The second connection port 12 of the first heat exchanger 10B is connected to the third connection port 21B of the second heat exchanger 20B. The second heat exchanger 20B further has a fifth connection port 23B and a sixth connection port 24B connected to an indoor system (not shown in the drawings) for extracting heat therefrom.

A predetermined amount of refrigerant may circulate between the first heat exchanger 10B, the compressor 200B, and the second heat exchanger 20B through the connecting pipes 100B and the four-way reversing valve 60B. At the same time, water may circulate between the heat exchanging arrangement 40B and the first heat exchanger 10B.

The main casing 41B of the heat exchanging arrangement 40B is partitioned into the water atomizing compartment 412B and the water showering compartment 413B. As shown in FIG. 8 of the drawings, the water atomizing compartment 412B and the water showering compartment 413B are formed in a side-by-side manner so that ambient air drawn from the air inlet 414B is arranged to first pass through the water atomizing compartment 412B and then the water showering compartment 413B.

The heat exchanging arrangement 40B comprises a plurality of water atomizing units 43B connected to the water output port 32B of the water pump 30B. The water atomizing units 43B are arranged to atomize the water supplied to the water atomizing units 43B into very fine droplets or mists. Atomized water is then arranged to be disposed or guided to accommodate in the water atomizing compartment 412B. The atomized water may eventually be collected in the water collection basin 46B provided underneath the water atomizing units 43B.

On the other hand, the heat exchanging arrangement 40B comprises a plurality of water showering heads 44B. The water showering heads 44B are connected to the water outlet 14B of the first heat exchanger 14B. Water from the first heat exchanger 14B is guided to flow to the water showering heads 44B which are arranged to produce a spray of water (as opposed to atomized water) on the fill material unit 45B provided there underneath. The water sprinkled on the fill material unit 45B is arranged to form a thin film of water flow along a vertical direction of the fill material unit 45B so as to increase heat exchange surface area between the water film and the ambient air. Eventually, the water in the fill material unit 45B is guided to flow downwardly along the fill material unit 45B and drop into the water collection basin 46B provided underneath the fill material unit 45B. A longitudinal direction of the water collection basin 46B extend across the water atomizing compartment 412B and the water showering compartment 413B. The fill material unit 45B in this second preferred embodiment is identical to what was disclosed in the first preferred embodiment above. Moreover, the water atomizing units 43B in this second preferred embodiment are structurally identical to what was disclosed in the first preferred embodiment above.

The fan 42B is provided in the main casing 41B in the vicinity of the air outlet 415B. The fan 42B may be driven to draw ambient air from the air inlet 414B, in which the ambient air will be guided to sequentially pass through the water atomizing compartment 412B, the water showering compartment 413B and eventually discharge out of the main casing 41B through the air outlet 415B. As shown in FIG. 8 of the drawings, the air outlet 415B and the fan 42B are positioned above the water showering heads 44 and above the water showering compartment 413B.

The operation of the present invention is as follows: the four-way reversing valve 60B can be selectively switched between an air conditioning mode and a heat pump mode. When the four-way reversing valve 60B is in the air conditioning mode, a predetermined amount of refrigerant may be guided to start an air conditioning cycle from the compressor 200B. Refrigerant may leave the compressor 200B through the compressor output port 202B and pass through the fourth communicative port 64B and the second communicative port 62B of the four-way reversing valve 60B and enter the first heat exchanger 10B through the first connection port 11B. The refrigerant entering the first heat exchanger 10B may perform heat exchange with the water circulating between the heat exchanging arrangement 40B and the first heat exchanger 10B, in such a manner that heat in the refrigerant is extracted to the water circulating between the heat exchanging arrangement 40B and the first heat exchanger 10B.

The refrigerant will then be guided to leave the first heat exchanger 10B through the second connection port 12B and enter the second heat exchanger 20B through the third heat refrigerant port 21B. The refrigerant entering the second heat exchanger 20B will then be arranged to perform heat exchange with indoor heat exchange medium and absorb heat therefrom. The refrigerant having absorbed heat from the indoor heat exchange medium will then be guided to exit the second heat exchanger 20B through the fourth connection port 22B and pass through the third communicative port 63B and the first communicative port 61B of the four-way reversing valve 60B. The heated refrigerant will eventually be guided to flow back to the compressor 200B through the compressor input port 201B to complete an air conditioning cycle.

On the other hand, water circulating in the first heat exchanger 10B is guided to leave the first heat exchanger 10B through the water outlet 14B and flow to the water showering heads 44B. The water flowing to the water showering heads 44B is arranged to be sprinkled or sprayed on the fill material unit 45B and form a thin film therein. The water flowing along the fill material unit 45B is arranged to perform heat exchange with the ambient air passing through the fill material unit 45B. The water in the fill material unit 45B will be cooled down by the ambient air flow and collected in the water collection basin 46B. The water collected in the water collection basin 46B is pumped back to the first heat exchanger 10B by the water pump 30B.

The flow of water exiting the water pump 30B is bifurcated into two streams. One of the streams is guided to enter the first heat exchanger 10B through the water inlet 13B for performing heat exchange with the refrigerant in the manner described above. Another stream or branch of the water is guided to flow back to the heat exchanging arrangement 40B and reach the water atomizing units 43B. The water reaching the water atomizing units 43B is arranged to be atomized and released to the water atomizing compartment 412B as mists or very fine droplets. The very tiny water mist is arranged to evaporate in the water atomizing compartment 412B and pre-cool the ambient air drawn from the air inlet 414B. In this way, the temperature of the ambient air entering the water showering compartment 413B will be substantially lowered. This will substantially increase the heat exchange effectiveness and efficiency between the ambient air and the thin film of water flowing in the fill material unit 45B.

It is worth mentioning that the stream of water flowing to the water atomizing units 43B can be driven by a pressure differential (typically in the range of 70 KPa-150 KPa) between the water inlet 13B of the first heat exchanger 10B and the water atomizing units 43B so that no additional energy is needed to atomize the water flowing to the water atomizing units 43B.

When the four-way reversing valve 60B is switched to the heat pump mode, a predetermined amount of refrigerant may be guided to start a heat pump cycle from the compressor 200B. Refrigerant may leave the compressor 200B through the compressor output port 202B and pass through the fourth communicative port 64B and the third communicative port 63B of the four-way reversing valve 60B and enter the second heat exchanger 20B through the fourth connection port 22B. The refrigerant entering the second heat exchanger 20B may perform heat exchange with the indoor heat exchange medium and release heat thereto. The refrigerant may then leave the second heat exchanger 20B through the third connection port 21B and subsequentially enter the first heat exchanger 10B through the second connection port 12B.

In the first heat exchanger 10B, the refrigerant will absorb heat from the water circulating between the first heat exchanger 10B and the heat exchanging arrangement 40B.

After absorbing heat, the refrigerant will leave the first heat exchanger 10B through the first connection port 11B, pass through the second communicative port 62B and the first communicative port 61B of the four-way reversing valve 60B, and eventually go back to the compressor 200B through the compressor input port 201B.

When the refrigeration unit of the present invention works as a heat pump, the water in the heat exchanging arrangement 40B absorb (as opposed to release) heat from the ambient air. In this situation, a predetermined amount of anti-freeze agent may be added to the water for preventing a temperature of the water from condensing into ice. Thus, the heat exchanging arrangement 40B further comprises a plurality of additives supply pipes 48B for adding a predetermined amount of anti-freeze agent to the water. In the second preferred embodiment, one of the additives supply pipes 48B may extend to the water collection basin 46B while one of the additives supply pipes 48B may extend to near the water input port 31B of the water pump 30B. A predetermined amount of anti-freeze agent may controllably be added to the water through the additives supply pipes 48B. The purpose of the anti-freeze agent is to lower the freezing point of a water in the heat exchanging arrangement 40B.

The heat exchanging arrangement 40B further comprises a control valve 49B provided between the water output port 32B of the water pump 30B and the water atomizing units 43B for selectively controlling a flow of water from the water pump 30B to the water atomizing units 43B. Specifically, when the refrigeration unit operates as a heat pump, the control valve 49B may be turned on to prevent water from flowing to the water atomizing units 43B. In other words, when the refrigeration unit works as heat pump and the temperature of the ambient air is above a predetermined threshold (i.e. the weather is not too cold), the water atomizing units 43B can be deactivated. Water from the water pump 30B may just need to flow to the water showering heads 44B for being sprinkled or showered to the fill material unit 45B. Accordingly, the fan 42B can also be switched off and disabled.

When the temperature of the ambient air falls below a predetermined threshold, the control valve 49B may need to be turned off to allow water from the water pump 30B to reach the water atomizing units 43B again. As in the first preferred embodiment, the water reaching the water atomizing units 43B will evaporate at a predetermined rate. At the same time, anti-freeze agent is added to the water for preventing the water from turning into ice. It is worth mentioning that the water passing through the water atomizing units 43B will be atomized in the water atomizing compartment 412B and some of the atomized water will be evaporated in the water atomizing compartment 412B. The partial evaporation of the water may maintain a desirable concentration of the anti-freeze agent in the water and this will ensure that the water will not freeze to a substantial degree. One skilled in the art would appreciate that too much ice or freezing water may damage heat exchangers in air conditioning and heat pump technology. The water atomizing units 43B of the present invention as described above helps to prevent this phenomenon from happening.

It is important to point out that the various alternative configurations of the heat exchanging arrangement 40 as described in the first preferred embodiment may also apply to the heat exchanging arrangement 40B in the second preferred embodiment.

Figure 9:
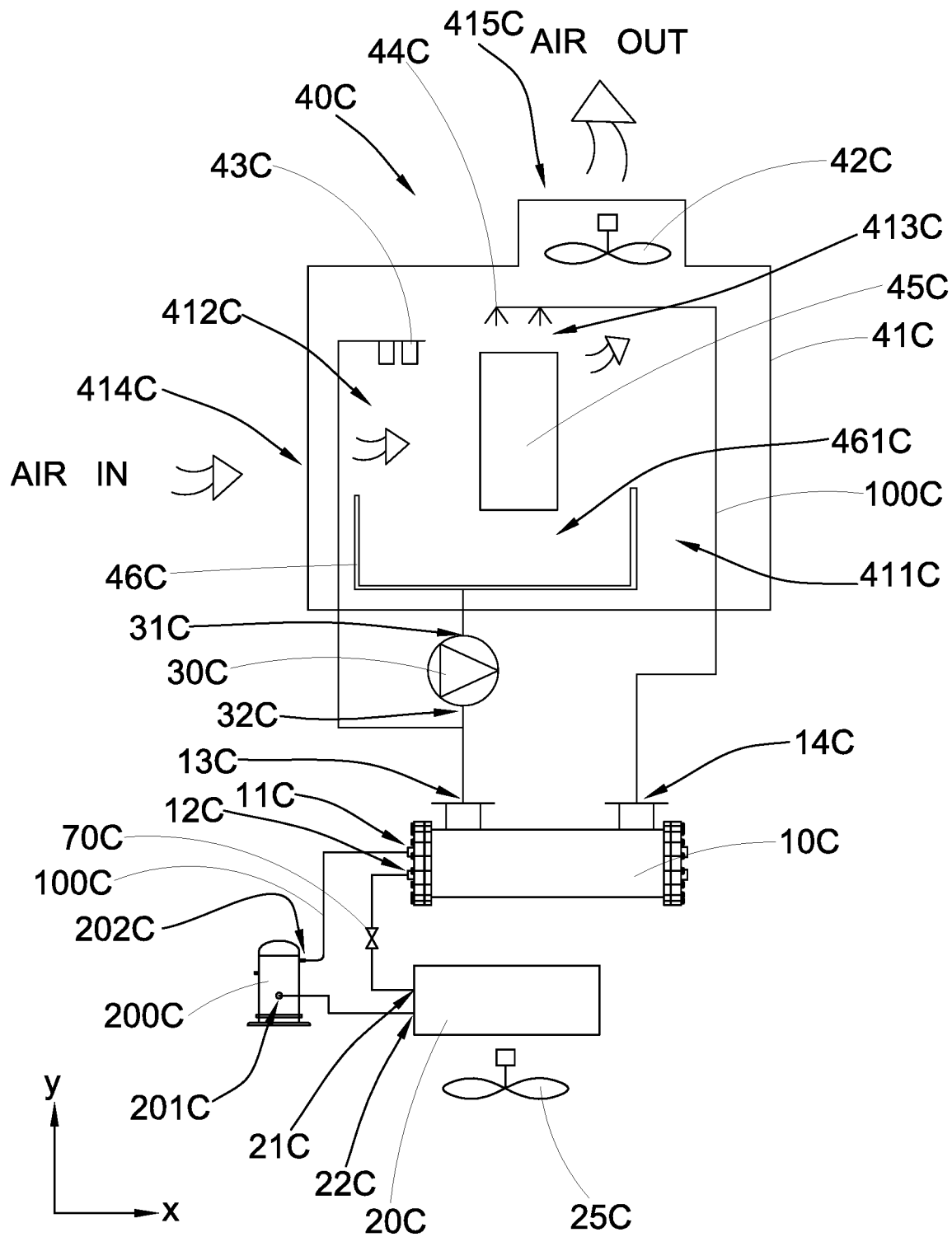
FIG. 9 is a schematic diagram of a refrigeration unit according to a third preferred embodiment of the present invention.
Figure 10:
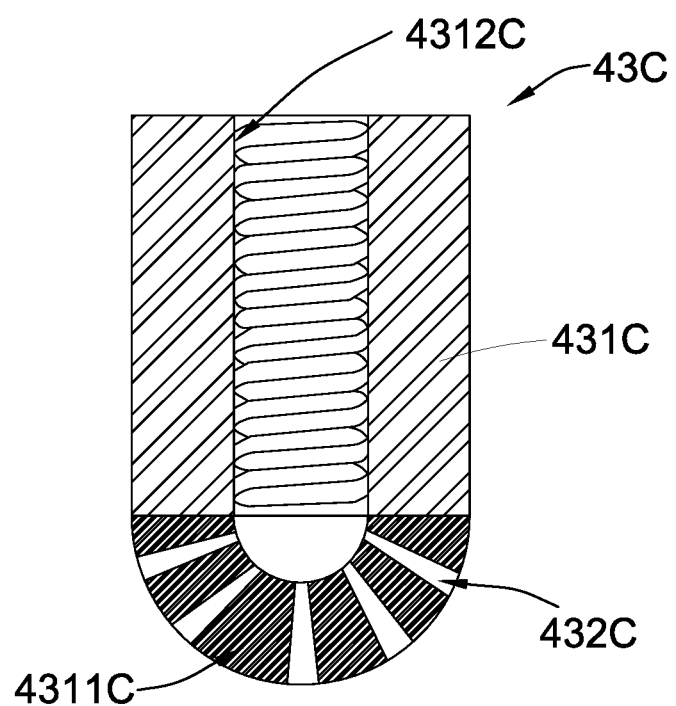
FIG. 10 is a schematic diagram of a water atomizing unit of a heat exchanging arrangement of the refrigeration unit according to the third preferred embodiment of the present invention.

Referring to FIG. 9 to FIG. 10 of the drawings, a refrigeration unit according to a third preferred embodiment of the present invention is illustrated. Broadly, the refrigeration unit comprises a plurality of connecting pipes 100C, a compressor 200C, a first heat exchanger 10C, a second heat exchanger 20C, a water pump 30C, and a heat exchanging arrangement 40C. The plurality of connecting pipes 100C are for allowing heat exchange medium to pass therethrough, so that heat exchange medium, such as refrigerant or water may pass through the elements of the refrigeration unit. In the description below, the connections between various elements of the refrigeration unit are carried out by at least one connecting pipe 100C.

The first heat exchanger 10C is connected to the compressor 200C through at least one of the connecting pipes 100C. The first heat exchanger 10C has a first connection port 11C and a second connection port 12C, a water inlet 13C and a water outlet 14C.

The second heat exchanger 20C is connected to the compressor 200C and the first heat exchanger 10C through at least one of the connecting pipes 100C. The second heat exchanger 20C has a third connection port 21C and a fourth connection port 22C.

The water pump 30C has a water input port 31C and a water output port 32C, wherein the water output port 32C is connected to the water inlet 13C of the first heat exchanger 10C.

The heat exchanging arrangement 40C comprises a main casing 41C, a fan 42C, at least one water atomizing unit 43C, at least one water showering head 44C, at least one fill material unit 45C, and a water collection basin 46C.

The main casing 41C has a receiving cavity 411C which is divided into at least one water atomizing compartment 412C and one water showering compartment 413C, an air inlet 414C communicating with the water atomizing compartment 412 of the receiving cavity 411C, and an air outlet 415C communicating with the water showering compartment 413C of the receiving cavity 411C.

The fan 42C is provided in the main casing 41C for drawing ambient air to enter the main casing 41C through the air inlet 414C and exit the main casing 41C through the air outlet 415C.

The water atomizing unit 43C is provided in the water atomizing compartment 412C and connected to the water output port 32C of the water pump 30C through at least one of the connecting pipes 100C.

The water showering head 44C is provided in the water showering compartment 413C and connected to the water outlet 14C of the first heat exchanger 10C. The fill material unit 45 is provided underneath the water showering head 44.

The water collection basin 46C has a collection cavity 461C and is provided underneath the water atomizing unit 43C and the fill material unit 45C. With the above configuration, a predetermined amount of heated water in the first heat exchanger 10C is arranged to be guided to flow to the water showering head 44C through the water outlet 14C and through at least one of the connecting pipes 100C. The water in the water showering head 44C may be sprinkled on the fill material unit 45C and collected in the water collection basin 46C.

A predetermined amount of water from the water output port 32C of the water pump 30C is guided to flow to the water atomizing unit 43C through at least one of the connecting pipes 100C. The water flowing to the water atomizing unit 43C is finely sprayed and atomized in the water atomizing compartment 412C.

On the other hand, the ambient air is being drawn to sequentially pass through the water atomizing compartment 412C and the water showering compartment 413C to cool down a temperature of the water in the water showering compartment 413C. The water collected in the water collection basin 46C is guided to flow into the water pump 30C through the water input port 31C and at least one of the connecting pipes 100C.

According to the third preferred embodiment of the present invention, the refrigeration unit is utilized to produce cooled air in a designated space (i.e. an air conditioning system). A predetermined of heat exchange medium, such as refrigerant, is guided to pass through the connecting pipes 100C so as to extract and retrieve heat from another heat exchange medium, such as refrigerant or water.

Referring to FIG. 9 of the drawings, the compressor 200C has a compressor input port 201C and a compressor output port 202C, wherein refrigerant is arranged to enter the compressor 200C through the compressor input port 201C and leave the compressor 200C through the compressor output port 202C.

The compressor output port 202C is connected to the first connection port 11C of the first heat exchanger 10C. The compressor input port 201C is connected to the fourth connection port 22C of the second heat exchanger 20C. The second connection port 12 of the first heat exchanger 10C is connected to the third connection port 21C of the second heat exchanger 20C, preferably through a flow regulator 70C. The second heat exchanger 20C may be configured to perform heat exchange with air (such as ambient air or air from a designated indoor space) so that heat from the refrigerant flowing through the second heat exchanger 20C may be carried away by air. Thus, the refrigeration unit further comprises a heat transfer fan 25C communicated with the second heat exchanger 20C for drawing air (such as air from the indoor space) to perform heat exchange with the refrigerant flowing through the second heat exchanger 20C.

A predetermined amount of refrigerant may circulate between the first heat exchanger 10C, the compressor 200C, and the second heat exchanger 20C. At the same time, water may circulate between the heat exchanging arrangement 40C and the first heat exchanger 10C. The heat exchanging arrangement 40C in the third preferred embodiment can be configured to extract heat from the water to ambient air.

The main casing 41C of the heat exchanging arrangement 40C is partitioned into the water atomizing compartment 412C and the water showering compartment 413C. As shown in FIG. 9 of the drawings, the water atomizing compartment 412C and the water showering compartment 413C are formed in a side-by-side manner so that ambient air drawn from the air inlet 414C is arranged to first pass through the water atomizing compartment 412C and then the water showering compartment 413C. In other words, the water atomizing compartment 412C and the water showering compartment 413C communicate with each other.

The heat exchanging arrangement 40C comprises a plurality of water atomizing units 43C connected to the water output port 32C of the water pump 30C. The water atomizing units 43C are arranged to atomize the water supplied to the water atomizing units 43C into very fine droplets. Atomized water is then arranged to be disposed or guided to accommodate in the water atomizing compartment 412C. The atomized water may eventually be collected in the water collection basin 46C provided underneath the water atomizing units 43C.

On the other hand, the heat exchanging arrangement 40C comprises a plurality of water showering heads 44C. The water showering heads 44C are connected to the water outlet 14C of the first heat exchanger 14C. Water having relatively higher temperature and coming from the first heat exchanger 14C is guided to flow to the water showering heads 44C which are arranged to produce a spray of water (as opposed to atomized water) on the fill material unit 45C provided there underneath.

Note that the difference between the spray of water or atomization of water is that in the former, a stream of water is broken down into very fine particles or droplets while in the latter, a stream of water is merely diverted to form a spray or showering of water without water being transformed into very fine particles or droplets. It works as sprinkling of water onto the fill material unit 45.

The water sprinkled on the fill material unit 45C is arranged to form a thin film of water flow along a vertical direction of the fill material unit 45C so as to increase heat exchange surface area between the water film and the ambient air. Eventually, the water in the fill material unit 45C is guided to flow downwardly along the fill material unit 45C and drop into the water collection basin 46C provided underneath the fill material unit 45C. Thus, a transverse direction (x-direction as shown in FIG. 9) of the water collection basin 46C extend across a transverse direction of the water atomizing compartment 412C and the water showering compartment 413C.

According to the third preferred embodiment of the present invention, the fill material unit 45C may be conventional fill material used in air conditioning area and may be configured from plastic material, aluminum, or stainless steel. The fill material unit 45C may comprise a plurality of elongated thin members, wherein the elongated thin members are closely placed and have flat, corrugated or textured heat exchange surface. The heat exchange surfaces can allow water to flow along so that when ambient air passes through the fill material unit, heat exchange takes place between the ambient air and the water flowing through the fill material unit 45C.

The fan 42C is provided in the main casing 41C in the vicinity of the air outlet 415C. The fan 42C may be driven to draw ambient air from the air inlet 414C, in which the ambient air will be guided to sequentially pass through the water atomizing compartment 412C, the water showering compartment 413C and eventually discharge out of the main casing 41C through the air outlet 415C. As shown in FIG. 9 of the drawings, the air outlet 415C and the fan 42C are positioned above the water showering heads 44C and above the water showering compartment 413C.

Figure 12:
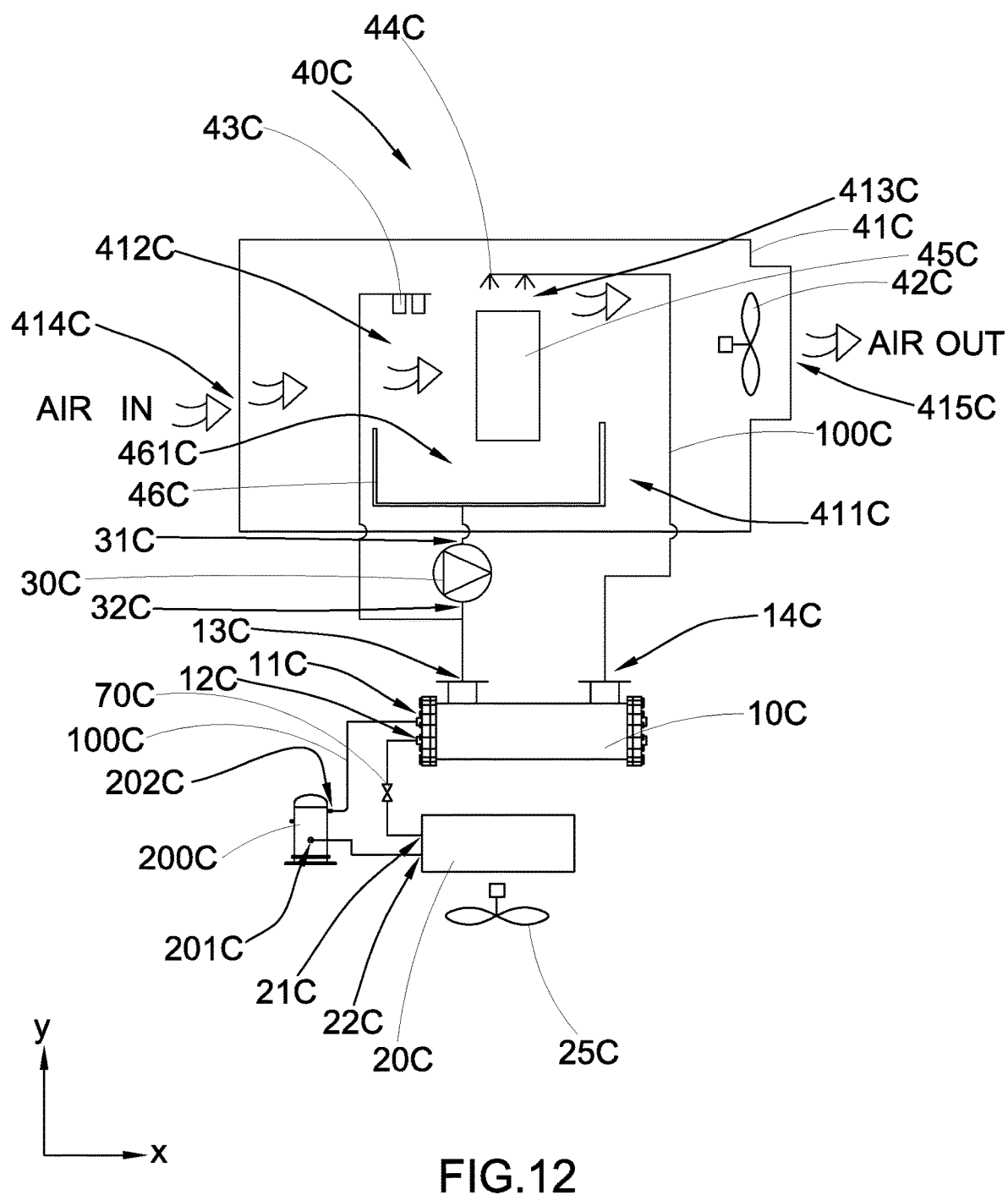
FIG. 12 is an alternative installation configuration of a fan of the heat exchanging arrangement of the refrigeration unit according to the third preferred embodiment of the present invention.

It should be understood that the fan 42C may be installed or connected in other positions so as to fit different operational circumstances of the present invention. For example, as shown in FIG. 12 of the drawings, the fan 42C and the air outlet 415C may be provided on one side (such as right side) of the water showering compartment 413C so that ambient air may be drawn to sequentially flow from the air inlet 414C, the water atomizing compartment 412C, the water showering compartment 413C, the fan 42C, and the air outlet 415C in a left-to-right direction.

Referring to FIG. 10 of the drawings, each of the water atomizing units 43C comprises a main body 431C having a hollow cylindrical structure and a plurality of atomizing channels 432C evenly extending on a bottom portion 4311C of the main body 431C for allowing water to pass through. Each of the atomizing channels 432C has a gradually increasing diameter from a top to bottom so as to atomize water pass through the main body 431C. Each of the main body 431C has a bored inner sidewall 4312C for allowing the water atomizing unit 43C to be attached on an external object.

The operation of the present invention is as follows: a predetermined amount of refrigerant may be guided to start an air conditioning cycle from the compressor 200C. Refrigerant may leave the compressor 200C through the compressor output port 202C and enter the first heat exchanger 10C through the first connection port 11C. The refrigerant entering the first heat exchanger 10C may perform heat exchange with the water circulating between the heat exchanging arrangement 40C and the first heat exchanger 10C, in such a manner that heat in the refrigerant is extracted to the water circulating between the heat exchanging arrangement 40C and the first heat exchanger 10C (the mechanism in which the heat in the water is extracted by the heat exchanging arrangement 40C will be described below).

The refrigerant will then be guided to leave the first heat exchanger 10C through the second connection port 12C and enter the second heat exchanger 20C through the third heat refrigerant port 21C. The refrigerant entering the second heat exchanger 20C will then be arranged to perform heat exchange with air (as circulated by the heat transfer fan 25C) so as to absorb heat from the air drawn by the heat transfer fan 25C and provide cooled air to indoor space. The refrigerant having absorbed heat from the air will then be guided to exit the second heat exchanger 20C through the fourth connection port 22C. The heated refrigerant will eventually be guided to flow back to the compressor 200C through the compressor input port 201C to complete an air conditioning cycle.

On the other hand, water circulating in the first heat exchanger 10C is guided to leave the first heat exchanger 10C through the water outlet 14C and flow to the water showering heads 44C. The water flowing to the water showering heads 44C is arranged to be sprinkled or sprayed on the fill material unit 45C and form a thin film therein. The water flowing along the fill material unit 45C is arranged to perform heat exchange with the ambient air passing through the fill material unit 45C. The water in the fill material unit 45C will be cooled down by the flow of ambient air and collected in the water collection basin 46C. The water collected in the water collection basin 46C is pumped back to the first heat exchanger 10C by the water pump 30C.

The flow of water exiting the water pump 30C is bifurcated into two streams. One of the streams is guided to enter the first heat exchanger 10C through the water inlet 13C for performing heat exchange with the refrigerant in the manner described above. Another stream or branch of the water is guided to flow back to the heat exchanging arrangement 40C and reach the water atomizing units 43C. The water reaching the water atomizing units 43C is arranged to be atomized and released to the water atomizing compartment 412C. The very tiny water mist or droplets are arranged to evaporate in the water atomizing compartment 412C and pre-cool the ambient air drawn from the air inlet 414C. In this way, the temperature of the ambient air entering the water showering compartment 413C will be substantially lowered. The difference in temperature between the water spraying in the water showering compartment 413C and the ambient air will be substantially increase and this substantial increase in temperature difference allows substantial increase in heat exchange effectiveness and efficiency between the ambient air and the thin film of water flowing in the fill material unit 45C.

It is worth mentioning that the stream of water flowing to the water atomizing units 43C can be driven by a pressure differential (typically in the range of 70 KPa-150 KPa) between the water inlet 13C of the first heat exchanger 10C and the water atomizing units 43C so that no additional energy is needed to atomize the water flowing to the water atomizing units 43C.

Figure 11:
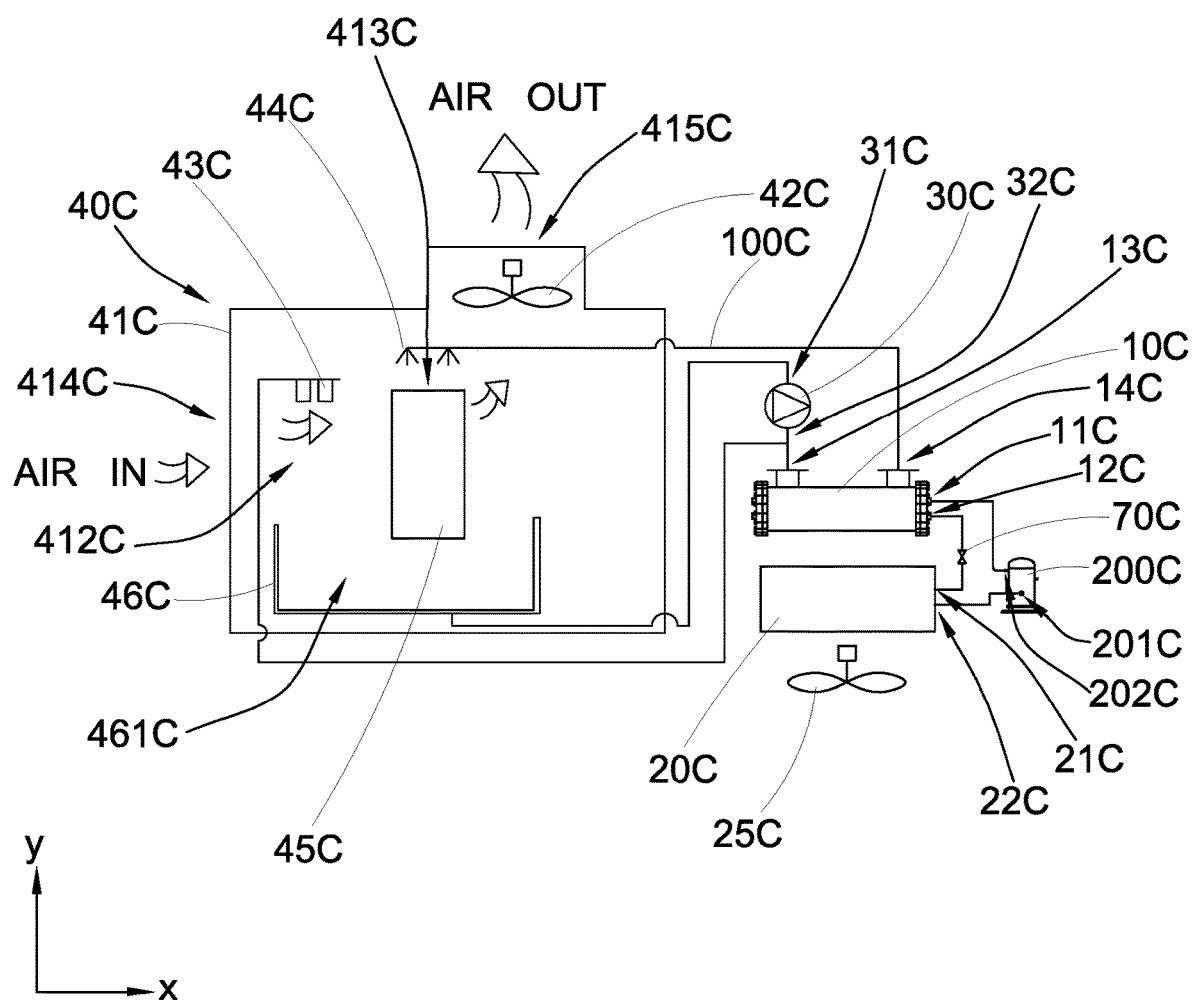
FIG. 11 is an alternative configuration of the refrigeration unit according to the third preferred embodiment of the present invention.

In addition, the configuration of the first heat exchanger 10C, the second heat exchanger 20C, the water pump 30, and the heat exchanging arrangement 40C may be varied depending on the circumstances in which the present invention is implemented. As shown in FIG. 9 of the drawings, the first heat exchanger 10C, the second heat exchanger 20C, the water pump 30C and the heat exchanging arrangement 40C may be installed in a top-down approach (i.e. vertical configuration) in which the heat exchanging arrangement 40C is positioned physically above the first heat exchanger 10C and the second heat exchanger 20C. Alternatively, as shown in FIG. 11 of the drawings, the heat exchanging arrangement 40C may be positioned at one side of the first heat exchanger 10C and the second heat exchanger 20C (i.e. side-by-side configuration).

Figure 13:
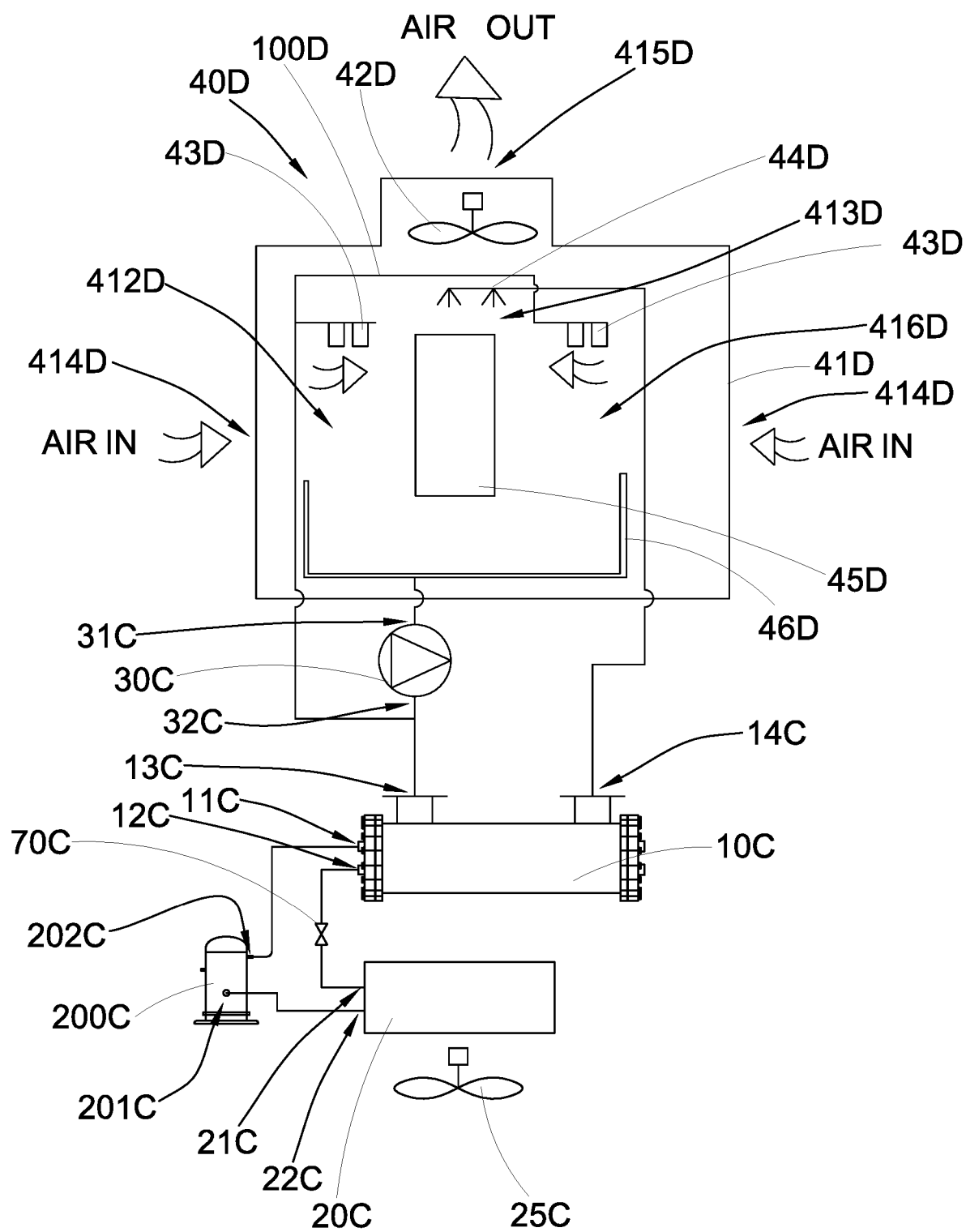
FIG. 13 is a first alternative mode of the refrigeration unit according to the third preferred embodiment of the present invention.

Referring to FIG. 13 of the drawings, a first alternative mode of the refrigeration unit according to the third preferred embodiment of the present invention is illustrated. The first alternative mode is similar to the third preferred embodiment, except the heat exchanging arrangement 40D. According to the second alternative mode, the main casing 41D further has a second water atomizing compartment 416D. For the sake of clarification, the water atomizing compartment 412D described in the third preferred embodiment above will be referred to as first atomizing compartment 412D, whereas the newly introduced atomizing compartment will be referred to as second atomizing compartment 416D. The second atomizing compartment 416D is provided adjacent to the water showering compartment 413D at an opposite side of the first water atomizing compartment 412D. In other words, the water showering compartment 413D is sandwiched between the first water atomizing compartment 412D and the second atomizing compartment 416D. Thus, the first water atomizing compartment 412D and the second atomizing compartment 416D are provided at two opposing sides of the water showering compartment 413D.

In the second alternative mode, the main casing 41D has two air inlets 414D provided one two sides of the main casing 41D, wherein ambient air may be drawn to enter the first water atomizing compartment 412D and the second atomizing compartment 416D through the two air inlets 414D respectively. Some of the water atomizing units 43D are provided in the first water atomizing compartment 412D and the second atomizing compartment 416D for atomizing water coming from the water output port 32C of the water pump 30C. The water atomizing units 43D in the first water atomizing compartment 412D and the second atomizing compartment 416D are connected in parallel through connecting pipes 100D. Thus, water from the water output port 32C of the water pump 30D will be guided to flow to the water atomizing units 43D in the first water atomizing compartment 412D and the second atomizing compartment 416D.

As shown in FIG. 13 of the drawings, the water collection basin 46D are provided underneath the water showering heads 44D and the fill material unit 45D in which a transverse direction (x-direction as shown in FIG. 13) of the water collection basin 46D extends across the first water atomizing compartment 412D and the second atomizing compartment 416D, as well as the water showering compartment 413D.

The air outlet 415D and the fan 42D are provided on a top portion of the main casing 41D at a position above the first water atomizing compartment 412D, the second atomizing compartment 416D and the water showering compartment 413D. Ambient air is drawn by the fan 42D to enter the main casing 41D through the air inlets 414D provided on two sides of the main casing 41D. The ambient air will then be guided to pass through the first water atomizing compartment 412D and the second atomizing compartment 416D. Ambient air leaving the first water atomizing compartment 412D and the second atomizing compartment 416D will be guided to enter the water showering compartment 413D to perform heat exchange with the water flowing along the fill material unit 45D. The air will then be drawn to leave the main casing 41D at a top portion thereof through the air outlet 415D.

Figure 14:
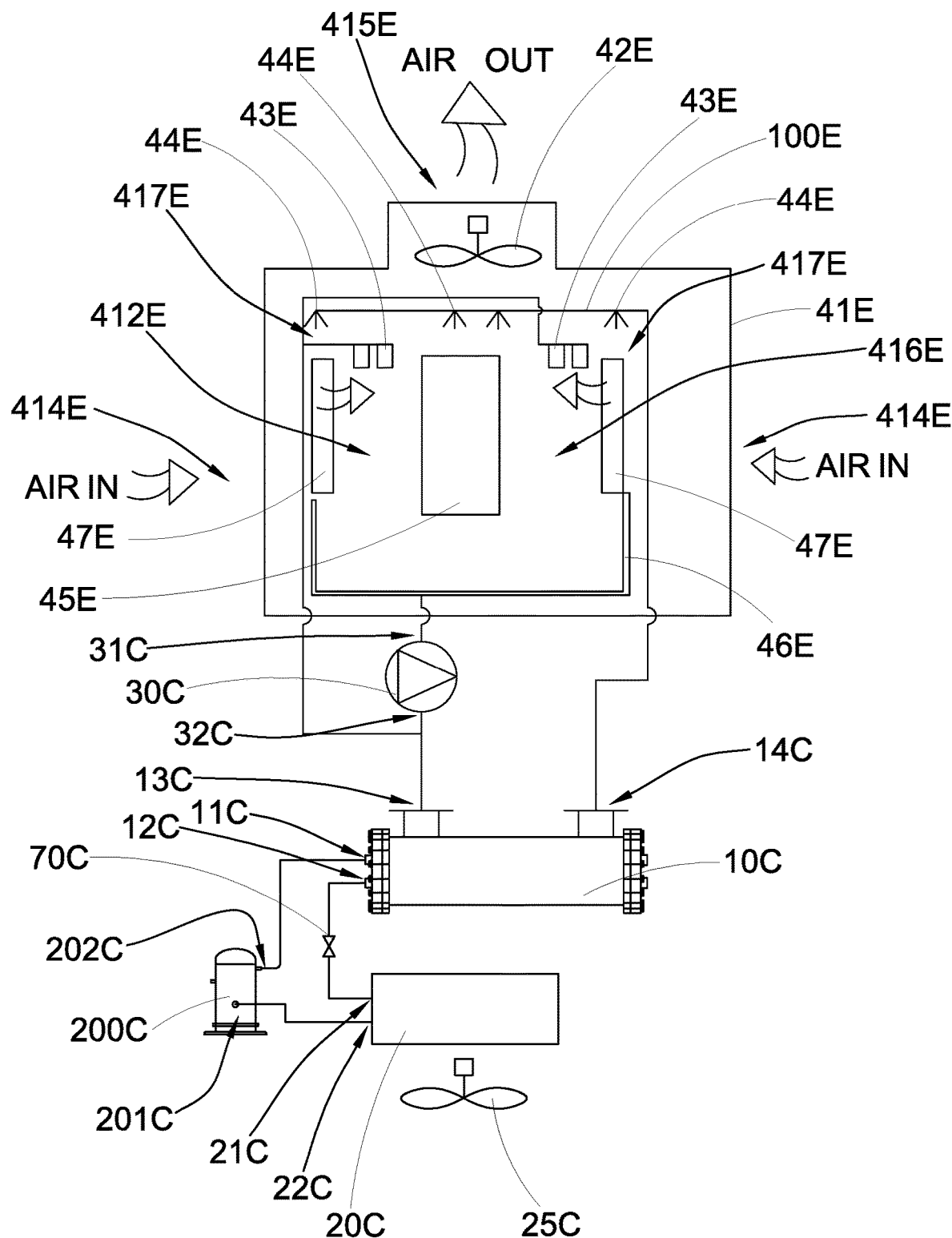
FIG. 14 is a second alternative mode of the refrigeration unit according to the third preferred embodiment of the present invention.

Referring to FIG. 14 of the drawings, a second alternative mode of the refrigeration unit according to the third preferred embodiment of the present invention is illustrated. The second alternative mode is a modification to the first alternative mode of the third preferred embodiment described above. According to the second alternative mode, the main casing 41E further has two auxiliary water showering compartments 417E formed adjacent to an outer side of the first water atomizing compartment 412E and the second water atomizing compartment 416E respectively. Ambient air drawn into the main casing 41E will be guided to first pass through the two auxiliary water showering compartments 417E before reaching the first water atomizing compartment 412E and the second water atomizing compartment 416E.

The heat exchanging arrangement 40E further comprises a plurality of auxiliary fill material units 47E provided in the auxiliary water showering compartments 417A respectively, wherein at least two of the water showering heads 44E are provided above the auxiliary fill material units 47E respectively for sprinkling or showering water on the corresponding auxiliary fill material units 47E.

The water showering in the auxiliary water showering compartment 417E serves to prevent atomized water from escaping from the first water atomizing compartment 412E and the second water atomizing compartment 416E so as to allow the maximize amount of atomized water to evaporate in the first water atomizing compartment 412E and the second water atomizing compartment 416E for lowering the temperature of the ambient air. Note that all of the water showering heads 44E are connected to the water outlet 14C of the first heat exchanger 10C.

Moreover, the water collection basin 46E are provided underneath the water atomizing units 43E, the fill material unit 45E and the auxiliary fill material units 47E in which a transverse direction (x-direction as shown in FIG. 14) of the water collection basin 46E extends across a transverse direction of the auxiliary water showering compartments 417E, the first water atomizing compartment 412E the second atomizing compartment 416E, as well as the water showering compartment 413E.

The water atomizing units 43E in the first water atomizing compartment 412E and the second atomizing compartment 416E are connected in parallel through connecting pipes 100E. Water from the water output port 32C of the water pump 30C will be guided to flow to the water atomizing units 43E in the first water atomizing compartment 412E and the second atomizing compartment 416E. Ambient air is drawn from the air inlets 414E at two sides of the main casing 41E to the air outlet 415E at the top portion of the main casing by operation of the fan 42E.

Figure 15:
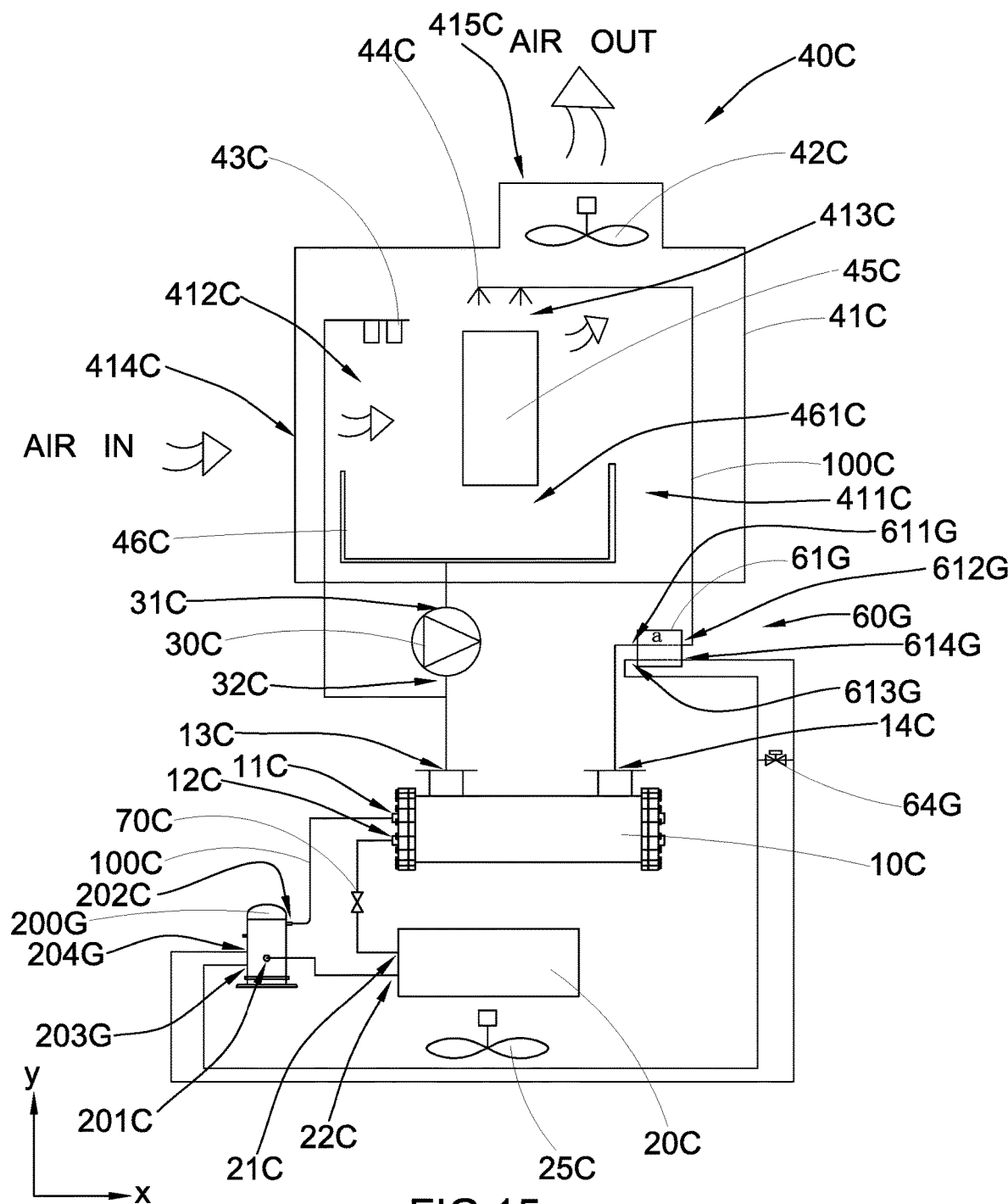
FIG. 15 is a third alternative mode of the refrigeration unit according to the third preferred embodiment of the present invention.

Referring to FIG. 15 of the drawings, a third alternative mode of the refrigeration unit according to the third preferred embodiment of the present invention is illustrated. The third alternative mode is identical to the third preferred embodiment, except the refrigeration unit further comprises a lubricant oil cooling arrangement 60G. The lubricant oil cooling arrangement 60G is connected to the first heat exchanger 10C, the heat exchanging arrangement 40C, and the compressor 200G through a plurality of connecting pipes 100C. Broadly, the lubricant oil cooling arrangement 60G comprises a third heat exchanger 61G. The lubricant oil cooling arrangement 60G is designed to cool down lubricant circulating in the compressor 200G. Thus, the compressor 200C further has a lubricant outlet 203G and a lubricant inlet 204G.

According to the third alternative mode of the third preferred embodiment, the third heat exchanger 61G has a first water passage port 611G, a second water passage port 612G, a first lubricant passage port 613G, and a second lubricant passage port 614G. The first water passage port 611G is connected to the water outlet 14C of the first heat exchanger 10C, while the second water passage port 612G is connected to at least one of the water showering heads 44C of the heat exchanging arrangement 40C. On the other hand, the first lubricant passage port 613G is connected to the lubricant outlet 203G of the compressor 200C, while the second lubricant passage port 614G is connected to the lubricant inlet 204G.

The lubricant oil cooling arrangement 60G further comprises an electromagnetic valve 64G connected between the first lubricant passage port 613G and the second lubricant passage port 614G, and between the lubricant outlet 203G and the lubricant inlet 204G of the compressor 200C. This configuration can be shown in FIG. 15 of the drawings. The electromagnetic valve 64G is arranged to control a flow of lubricant between the compressor 200C and the third heat exchanger 61G.

The lubricant oil cooling arrangement 60G is utilized for cooling lubricant, such as lubricating oil, circulating in the compressor 200C. The operation is as follows: lubricant having relatively higher temperature is allowed to leave the compressor 200C through the lubricant outlet 203G and is guided to enter the first lubricant passage port 613G. The lubricant entering the third heat exchanger 61G is arranged to perform heat exchange with the water circulating between the third heat exchanger 61G and the heat exchanging arrangement 40C.

Specifically, the water coming out from the water outlet 14C of the first heat exchanger 10C is arranged to enter the third heat exchanger 61G through the first water passage port 611G. The water will then perform heat exchange with the lubricant flowing through the third heat exchanger 61G and absorb heat therefrom. The cooled lubricant is then arranged to leave the third heat exchanger 61G through the second lubricant passage port 614G. The lubricant leaving the second lubricant passage port 614G is then arranged to flow back to the compressor 200G through the lubricant inlet 204G.

The water having absorbed heat from the lubricant is arranged to leave the third heat exchanger 61G through the second water passage port 612G and reach the water showering heads 44C. The water is then sprayed to the fill material unit 45C in the manner described in the third preferred embodiment above. The water collected in the water collection basin 46C is arranged to be pumped back to the first heat exchanger 10C by the pump 30C also in the manner described in the third preferred embodiment above.

Figure 16:
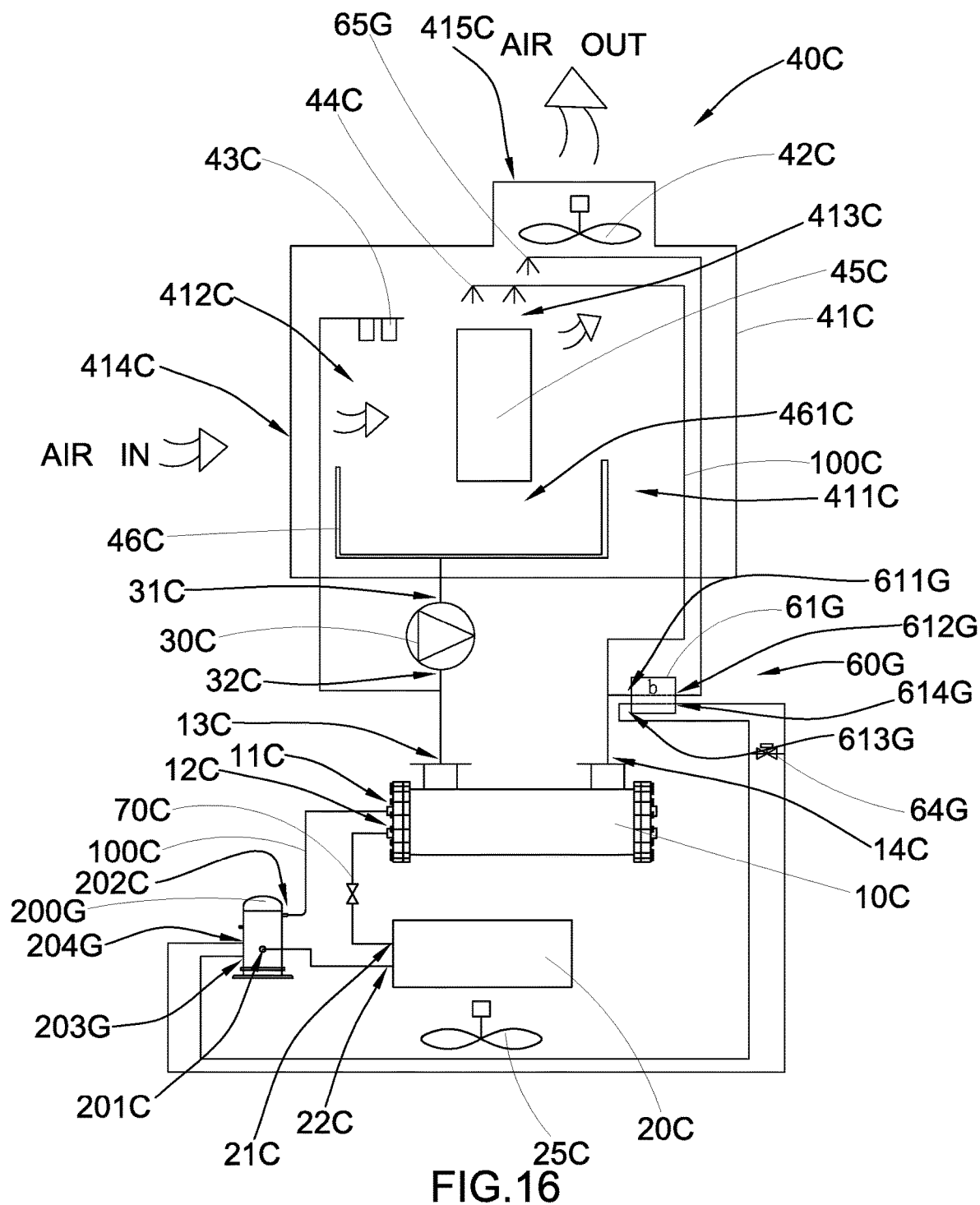
FIG. 16 is a fourth alternative mode of the refrigeration unit according to the third preferred embodiment of the present invention.

Referring to FIG. 16 of the drawings, a fourth alternative mode of the refrigeration unit according to the third preferred embodiment of the present invention is illustrated. The fourth alternative mode is very similar to the third alternative mode of the third preferred embodiment described above, except the refrigeration unit further comprises an auxiliary water showering head 65G.

According to the fourth alternative mode of the third preferred embodiment, the third heat exchanger 61G has a first water passage port 611G, a second water passage port 612G, a first lubricant passage port 613G, and a second lubricant passage port 614G. The first water passage port 611G is connected to the water outlet 14C of the first heat exchanger 10C and at least one of the water showering heads 44C of the heat exchanging arrangement 40C, while the second water passage port 612G is connected to the auxiliary water showering head 65G positioned adjacent to the water showering heads 44C of the heat exchanging arrangement 40C. The first lubricant passage port 613G is connected to the lubricant outlet 203G of the compressor 200C, while the second lubricant passage port 614G is connected to the lubricant inlet 204G.

The difference between the third alternative mode and the fourth alternative mode of the third preferred embodiment is that in the fourth alternative mode, the second water passage port 612G is connected to the auxiliary water showering head 65G which is a dedicated water showering head apart from the water showering heads 44G of the heat exchanging arrangement 40C.

On the other hand, a majority portion of water coming out from the water outlet 14C is also guided to reach the water showering heads 44G of the heat exchanging arrangement 40C for sprinkling on the fill material unit 45C. Thus, water coming out from the water outlet 14C is bifurcated into two streams, one being directed to the third heat exchanger 61G, the other being directed to the water showering heads 44C.

Figure 17:
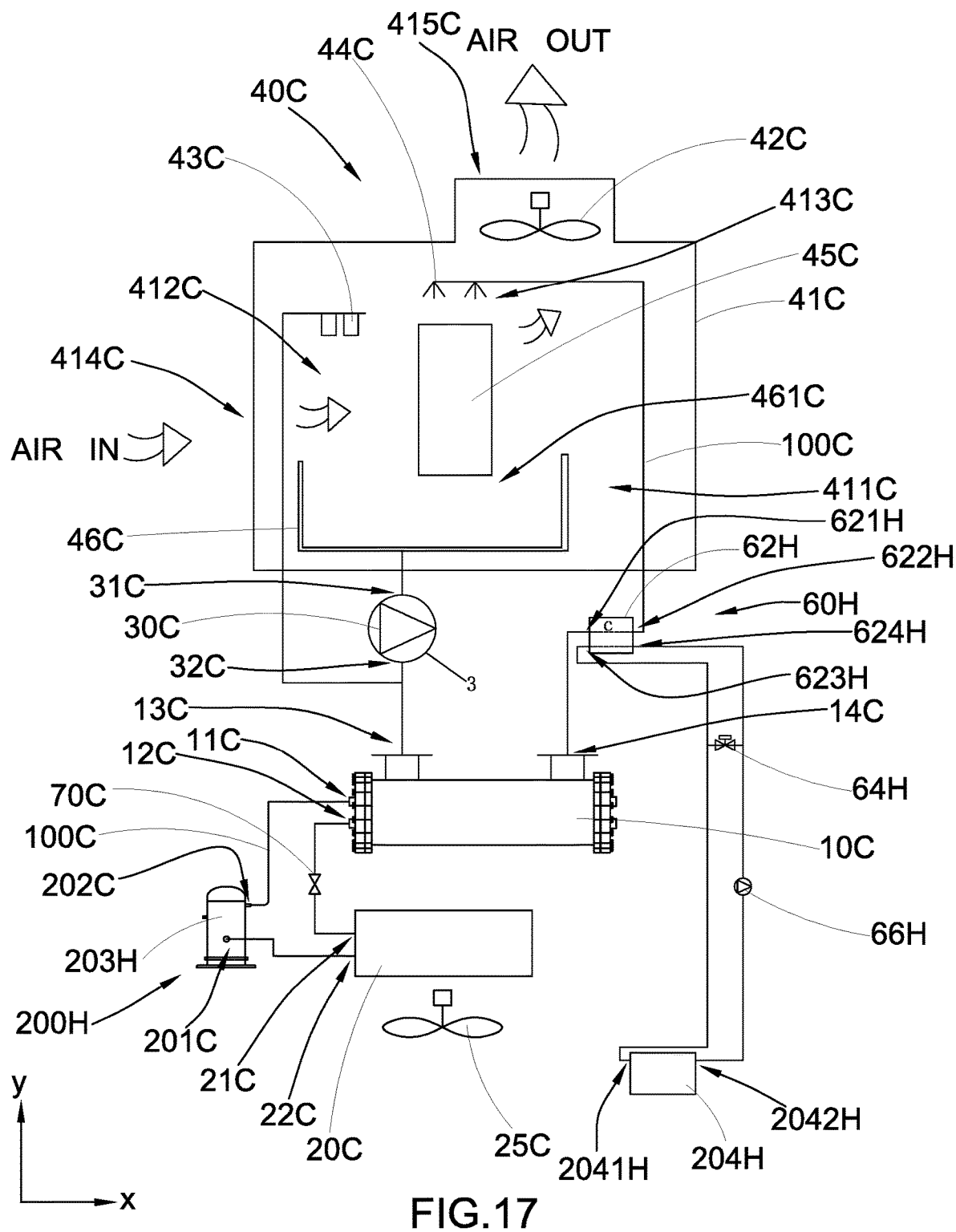
FIG. 17 is a fifth alternative mode of the refrigeration unit according to the third preferred embodiment of the present invention.

Referring to FIG. 17 of the drawings, a fifth alternative mode of the refrigeration unit according to the third preferred embodiment of the present invention is illustrated. The fifth alternative mode is identical to the third preferred embodiment, except the refrigeration unit further comprises an inverter cooling arrangement 60H, and the compressor 200H is configured as an inverter compressor. Thus, the compressor 200H, such as a rotary screw compressor, comprises a main compressor unit 203H and a compressor inverter 204H. The compressor inverter 204H may be a variable-frequency power inverter of a variable-speed drive for the main compressor unit 203H. The compressor inverter 204H will produce a substantial amount of heat when operating. The inverter cooling arrangement 60H may be used to cool down the temperature of the compressor inverter 204H. The main compressor unit 203H has a compressor input port 201C and a compressor output port 202C.

Referring to FIG. 17 of the drawings, the inverter cooling arrangement 60H comprises a fourth heat exchanger 62H. The inverter cooling arrangement 60H is designed to cool down compressor inverter 204H. The fourth heat exchanger 62H has a third water passage port 621H, a fourth water passage port 622H, a first coolant passage port 623H, and a second coolant passage port 624H. The third water passage port 621H is connected to the water outlet 14C of the first heat exchanger 10C, while the fourth water passage port 622H is connected to at least one of the water showering heads 44C of the heat exchanging arrangement 40C. On the other hand, the first coolant passage port 623H is connected to a coolant outlet 2041H of the compressor inverter 204H, while the second coolant passage port 624H is connected to a coolant inlet 2042H of the compressor inverter 204H. The coolant of the compressor inverter 204H may be water. Thus, the inverter cooling arrangement 60H further comprises a coolant pump 66H connected between the second coolant passage port 624H and the coolant inlet 2042H of the compressor inverter 204H for circulating the coolant.

The coolant cooling arrangement 60H further comprises an electromagnetic valve 64H connected between the first coolant passage port 623H and the second coolant passage port 624H, and between the coolant outlet 2041H and the coolant inlet 2042H of the compressor inverter 204H. This configuration can be shown in FIG. 17 of the drawings. The electromagnetic valve 64H is arranged to control a flow of coolant between the compressor inverter 204H and the fourth heat exchanger 62H.

The coolant cooling arrangement 60H is utilized for cooling coolant, such as water, circulating in the compressor inverter 204H. The operation is as follows: coolant having relatively higher temperature is allowed to leave the compressor inverter 204H through the coolant outlet 2041H and is guided to enter first coolant passage port 623H. The coolant entering the fourth heat exchanger 62H is arranged to perform heat exchange with the water circulating between the fourth heat exchanger 62H and the heat exchanging arrangement 40C.

The water coming out from the water outlet 14C of the first heat exchanger 10C is arranged to enter the fourth heat exchanger 62H through the third water passage port 621H. The water will then perform heat exchange with the coolant flowing through the fourth heat exchanger 62H and absorb heat therefrom. The cooled coolant is then arranged to leave the fourth heat exchanger 62H through the second coolant passage port 624H. The coolant leaving the second coolant passage port 624H is then arranged to flow back to the compressor inverter 204H through the coolant inlet 2042H.

The water having absorbed heat from the coolant is arranged to leave the fourth heat exchanger 62H through the fourth water passage port 622H and reach at least one of the water showering heads 44C. The water is then sprayed to the fill material unit 45C in the manner described in the third preferred embodiment above. The water collected in the water collection basin 46C is arranged to be pumped back to the first heat exchanger 10C by the pump 30C also in the manner described in the third preferred embodiment above.

Figure 18:
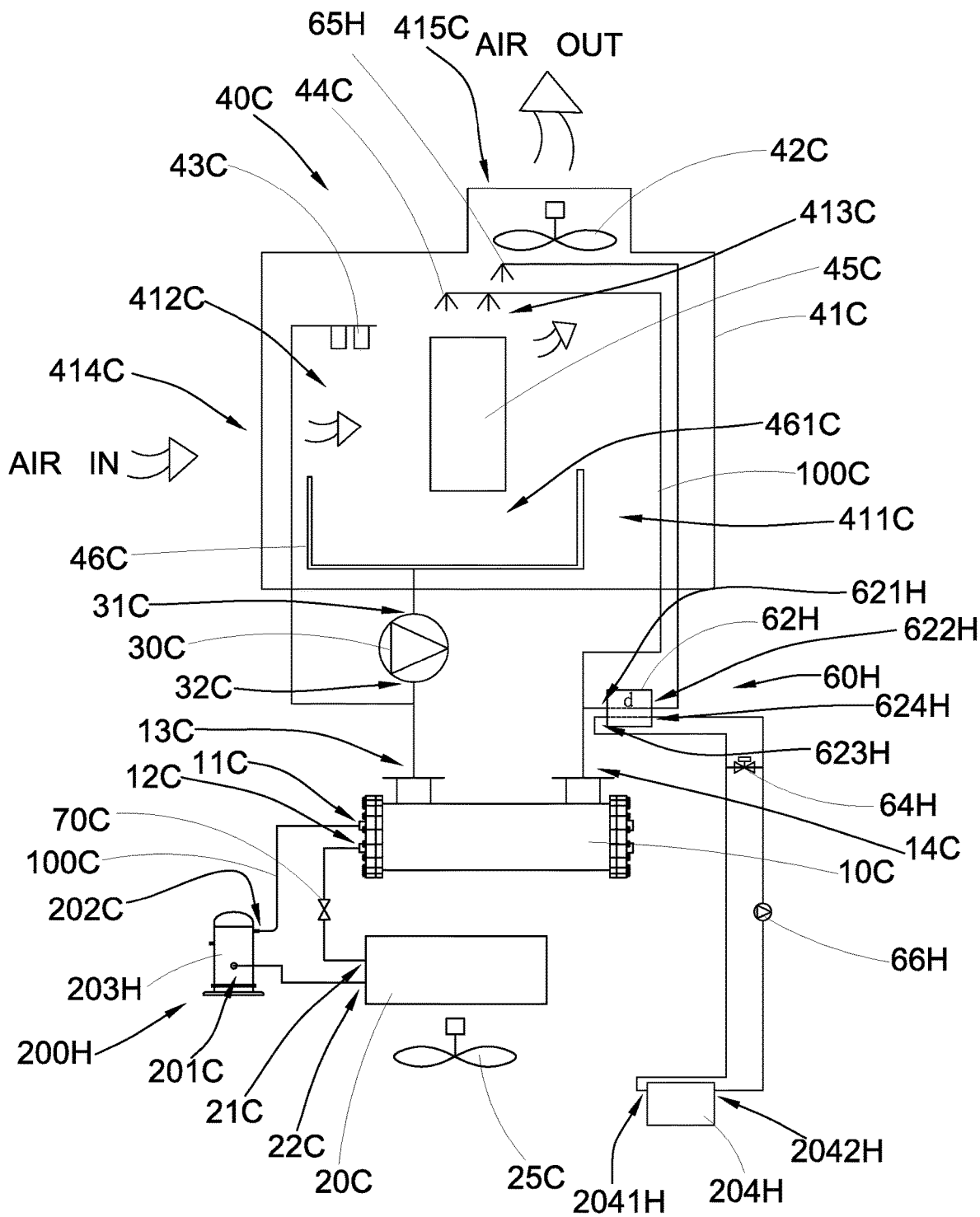
FIG. 18 is a sixth alternative mode of the refrigeration unit according to the third preferred embodiment of the present invention.

Referring to FIG. 18 of the drawings, a sixth alternative mode of the refrigeration unit according to the third preferred embodiment of the present invention is illustrated. The sixth alternative mode is very similar to the fifth alternative mode of the third preferred embodiment described above, except the refrigeration unit further comprises an auxiliary water showering head 65H.

According to the sixth alternative mode of the third preferred embodiment, the fourth heat exchanger 62H has a third water passage port 621H, a fourth water passage port 622H, a first coolant passage port 623H, and a second coolant passage port 624H. The third water passage port 621H is connected to the water outlet 14C of the first heat exchanger 10C and at least one of the water showering heads 44C of the heat exchanging arrangement 40C, while the fourth water passage port 622H is connected to the auxiliary water showering head 65H positioned adjacent to the water showering heads 44C of the heat exchanging arrangement 40C. The first coolant passage port 623H is connected to the coolant outlet 2041H of the compressor inverter 204H, while the second coolant passage port 624H is connected to the coolant inlet 2042H.

The difference between the fifth alternative mode and the sixth alternative mode of the third preferred embodiment is that in the sixth alternative mode, the second water passage port 622H is connected to the auxiliary water showering head 65H which is a dedicated water showering head apart from the water showering heads 44G of the heat exchanging arrangement 40C.

On the other hand, a majority portion of water coming out from the water outlet 14C is also guided to reach the water showering heads 44C of the heat exchanging arrangement 40C for sprinkling on the fill material unit 45C. Thus, water coming out from the water outlet 14C is bifurcated into two streams, one being directed to the fourth heat exchanger 62H, the other being directed to the water showering heads 44C.

It is important to mention that either one of the lubricant oil cooling arrangement and the coolant cooling arrangement described above may also be used in first alternative mode and the second alternative mode of the third preferred embodiment. These configurations are within the spirit of the present invention and should also be protected.

Figure 19:
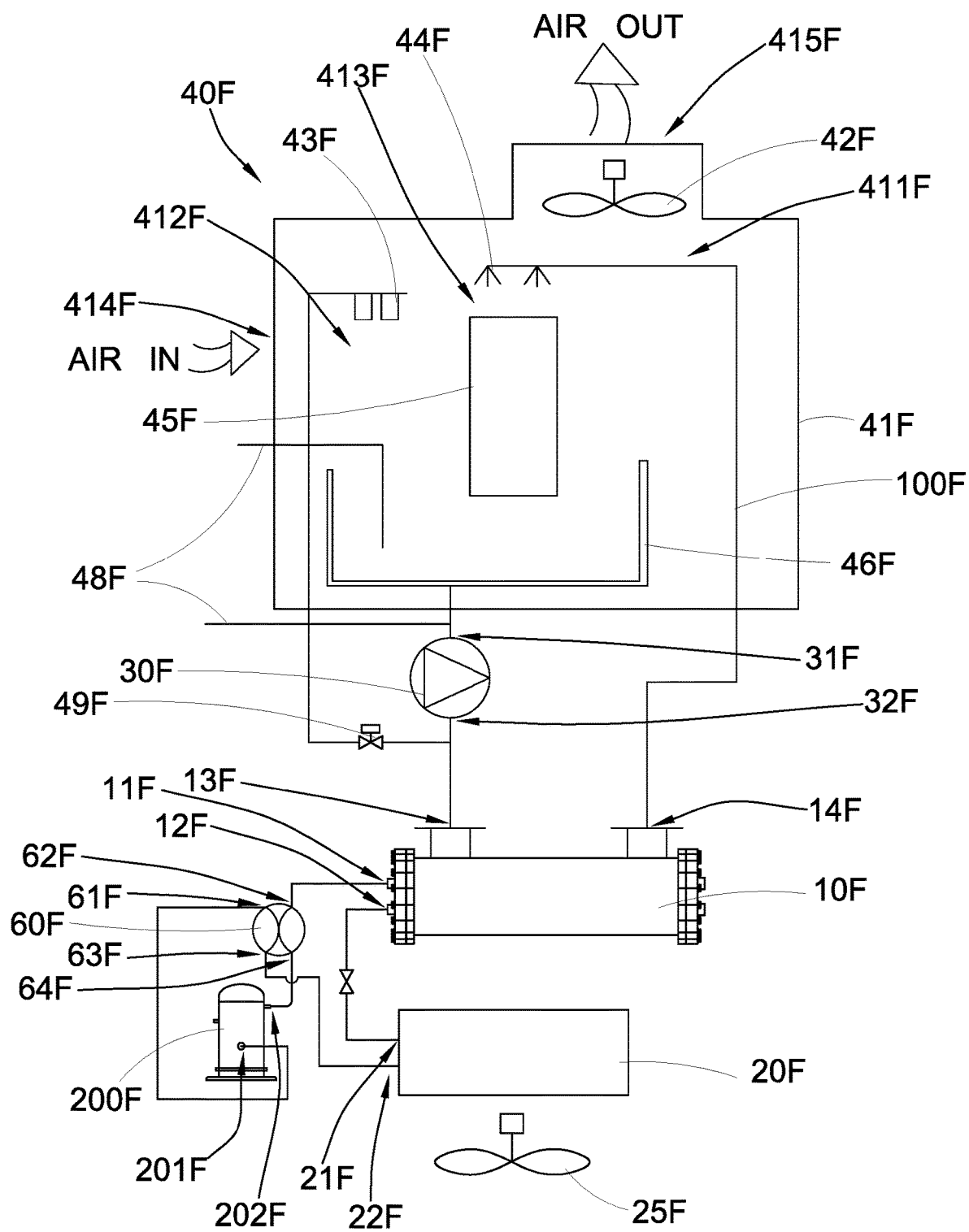
FIG. 19 is a refrigeration unit according to the fourth preferred embodiment of the present invention.

Referring to FIG. 19 of the drawings, a refrigeration unit according to a fourth preferred embodiment of the present invention is illustrated. Broadly, the refrigeration unit comprises a plurality of connecting pipes 100F, a compressor 200F, a first heat exchanger 10F, a second heat exchanger 20B, a water pump 30F, a four-way reversing valve 60F and a heat exchanging arrangement 40F. The plurality of connecting pipes 100F are for allowing heat exchange medium to pass therethrough, so that heat exchange medium, such as refrigerant or water may pass through the elements of the refrigeration unit. In the second preferred embodiment, the refrigeration unit may be selectively used as producing cooled air or heated air (i.e. an air conditioning and heat pump system).

The first heat exchanger 10F is connected to the compressor 200F through at least one of the connecting pipes 100F and the four-way reversing valve 60F. The first heat exchanger 10F has a first connection port 11F, a second refrigerator port 12F, a water inlet 13F and a water outlet 14F.

The second heat exchanger 20F is connected to the compressor 200F and the first heat exchanger 10F through at least one of the connecting pipes 100F and the four-way reversing valve 60F. The second heat exchanger 20F has a third connection port 21F and a fourth connection port 22F.

The water pump 30F has a water input port 31F and a water output port 32F, wherein the water output port 32F is connected to the water inlet 13F of the first heat exchanger 10F.

The heat exchanging arrangement 40F comprises a main casing 41F, a fan 42F, at least one water atomizing unit 43F, at least one water showering head 44F, at least one fill material unit 45F, and a water collection basin 46F.

The main casing 41F has a receiving cavity 411F divided into at least one water atomizing compartment 412F and one water showering compartment 413F, an air inlet 414F communicating with the water atomizing compartment 412F of the receiving cavity 411F, and an air outlet 415F communicating with the water showering compartment 413F of the receiving cavity 411F.

The fan 42F is provided in the main casing 41F for drawing ambient air to enter the main casing 41F through the air inlet 414F and exit the main casing 41F through the air outlet 415F.

The water atomizing unit 43F is provided on the water atomizing compartment 412F and connected to the water output port 32F of the water pump 30F through at least one of the connecting pipes 100F.

The water showering head 44F is provided on the water showering compartment 413F and is connected to the water outlet 14F of the first heat exchanger 10F. The fill material unit 45F is provided underneath the water showering head 44F.

The water collection basin 46F is provided underneath the water atomizing unit 43F and the fill material unit 45F. With the above configuration, a predetermined amount of water in the first heat exchanger 10F is arranged to be guided to flow to the water showering head 44F through the water outlet 14F and through at least one of the connecting pipes 100F. The water in the water showering head 44F may be sprinkled on the fill material unit 45F and collected in the water collection basin 46F.

A predetermined amount of water from the water output port 32F of the water pump 30F is guided to flow to the water atomizing unit 43F through at least one of the connecting pipes 100F. The water flowing to the water atomizing unit 43F is atomized in the water atomizing compartment 412F.

On the other hand, the ambient air is being drawn to sequentially pass through the water atomizing compartment 412F and the water showering compartment 413F to perform heat exchange with the water in the water showering compartment 413F. The water collected in the water collection basin 46F is guided to flow into the water pump 30F through the water input port 31F and at least one of the connecting pipes 100F.

According to the fourth preferred embodiment of the present invention, the refrigeration unit can be utilized to act as an air conditioning system or a heat pump system. A predetermined of heat exchange medium, such as refrigerant, is guided to pass through the connecting pipes 100F so as to extract and retrieve heat from another heat exchange medium, such as refrigerant, water or air.

Referring to FIG. 15 of the drawings, the compressor 200F has a compressor input port 201F and a compressor output port 202F, wherein refrigerant is arranged to enter the compressor 200F through the compressor input port 201F and leave the compressor 200F through the compressor output port 202F.

The four-way reversing valve 60F has first through fourth communicative port 61F, 62F, 63F, 64F, and may be selectively switched between an air conditioning mode and a heat pump mode, wherein in the air conditioning mode, the first communicative port 61F is connected to the third communicative port 63F, while the second communicative port 62F is connected to the fourth communicative port 64F. In the heat pump mode, the four-way reversing valve 60F is switched so that the first communicative port 61F is connected to second communicative port 62F while the third communicative port 63F is connected to the fourth communicative port 64F.

The compressor input port 201F is connected to the first communicative port 61F of the four-way reversing valve 60F. The compressor output port 202F is connected to the fourth communicative port 64F of the four-way reversing valve 60F.

Moreover, the first connection port 11F of the first heat exchanger 10F is connected to the second communicative port 62F of the four-way reversing valve 60F. The fourth connection port 22F of the second heat exchanger 20F is connected to the third communicative port 63F of the four-way reversing valve 60B. The second connection port 12F of the first heat exchanger 10F is connected to the third connection port 21F of the second heat exchanger 20F, preferably through a flow regulator 70F. The second heat exchanger 20F may be configured to perform heat exchange with air (such as ambient air) so that refrigerant flowing through the second heat exchanger 20F may be cooled by air (i.e. air-cooled heat exchanger). Thus, the refrigeration unit further comprises a heat transfer fan 25F communicated with the second heat exchanger 20F for drawing air (such as air from an indoor space) to perform heat exchange with the refrigerant flowing through the second heat exchanger 20F.

A predetermined amount of refrigerant may circulate between the first heat exchanger 10F, the compressor 200F, and the second heat exchanger 20F through the connecting pipes 100F and the four-way reversing valve 60F. At the same time, water may circulate between the heat exchanging arrangement 40F and the first heat exchanger 10F.

The main casing 41F of the heat exchanging arrangement 40F is partitioned into the water atomizing compartment 412F and the water showering compartment 413F. The water atomizing compartment 412F and the water showering compartment 413F are formed in a side-by-side manner so that ambient air drawn from the air inlet 414F is arranged to first pass through the water atomizing compartment 412F and then the water showering compartment 413F.

The heat exchanging arrangement 40F comprises a plurality of water atomizing units 43F connected to the water output port 32F of the water pump 30F. The water atomizing units 43F are arranged to atomize the water supplied to the water atomizing units 43F into very fine droplets or mists. Atomized water is then arranged to be disposed or guided to accommodate in the water atomizing compartment 412F. The atomized water may eventually be collected in the water collection basin 46F provided underneath the water atomizing units 43F.

On the other hand, the heat exchanging arrangement 40F comprises a plurality of water showering heads 44F. The water showering heads 44F are connected to the water outlet 14F of the first heat exchanger 14F. Water from the first heat exchanger 14F is guided to flow to the water showering heads 44F which are arranged to produce a spray of water (as opposed to atomized water) on the fill material unit 45F provided there underneath. The water sprinkled on the fill material unit 45F is arranged to form a thin film of water flow along a vertical direction of the fill material unit 45F so as to increase heat exchange surface area between the water film and the ambient air. Eventually, the water in the fill material unit 45F is guided to flow downwardly along the fill material unit 45F and drop into the water collection basin 46F provided underneath the fill material unit 45F. A longitudinal direction of the water collection basin 46F extend across the water atomizing compartment 412F and the water showering compartment 413F. The fill material unit 45F in this fourth preferred embodiment is identical to what was disclosed in the third preferred embodiment above. Moreover, the water atomizing units 43F in this fourth preferred embodiment are structurally identical to what was disclosed in the third preferred embodiment above.

The fan 42F is provided in the main casing 41F in the vicinity of the air outlet 415F. The fan 42F may be driven to draw ambient air from the air inlet 414F, in which the ambient air will be guided to sequentially pass through the water atomizing compartment 412F, the water showering compartment 413F and eventually discharge out of the main casing 41F through the air outlet 415F. The air outlet 415F and the fan 42F are positioned above the water showering heads 44F and above the water showering compartment 413F.

The operation of the present invention is as follows: the four-way reversing valve 60F can be selectively switched between an air conditioning mode and a heat pump mode. When the four-way reversing valve 60F is in the air conditioning mode, a predetermined amount of refrigerant may be guided to start an air conditioning cycle from the compressor 200F. Refrigerant may leave the compressor 200F through the compressor output port 202F and pass through the fourth communicative port 64F and the second communicative port 62F of the four-way reversing valve 60F and enter the first heat exchanger 10F through the first connection port 11F. The refrigerant entering the first heat exchanger 10F may perform heat exchange with the water circulating between the heat exchanging arrangement 40F and the first heat exchanger 10F, in such a manner that heat in the refrigerant is extracted to the water circulating between the heat exchanging arrangement 40F and the first heat exchanger 10F.

The refrigerant will then be guided to leave the first heat exchanger 10F through the second connection port 12F and enter the second heat exchanger 20F through the third heat refrigerant port 21F. The refrigerant entering the second heat exchanger 20F will then be arranged to perform heat exchange with air and absorb heat therefrom. The refrigerant having absorbed heat from the indoor heat exchange medium will then be guided to exit the second heat exchanger 20F through the fourth connection port 22F and pass through the third communicative port 63F and the first communicative port 61F of the four-way reversing valve 60F. The heated refrigerant will eventually be guided to flow back to the compressor 200F through the compressor input port 201F to complete an air conditioning cycle.

On the other hand, water circulating in the first heat exchanger 10F is guided to leave the first heat exchanger 10F through the water outlet 14F and flow to the water showering heads 44F. The water flowing to the water showering heads 44F is arranged to be sprinkled or sprayed on the fill material unit 45F and form a thin film therein. The water flowing along the fill material unit 45F is arranged to perform heat exchange with the ambient air passing through the fill material unit 45F. The water in the fill material unit 45F will be cooled down by the ambient air flow and collected in the water collection basin 46F. The water collected in the water collection basin 46F is pumped back to the first heat exchanger 10F by the water pump 30F.

The flow of water exiting the water pump 30F is bifurcated into two streams. One of the streams is guided to enter the first heat exchanger 10F through the water inlet 13F for performing heat exchange with the refrigerant in the manner described above. Another stream or branch of the water is guided to flow back to the heat exchanging arrangement 40F and reach the water atomizing units 43F. The water reaching the water atomizing units 43F is arranged to be atomized and released to the water atomizing compartment 412F as mists or very fine droplets. The very tiny water mist is arranged to evaporate in the water atomizing compartment 412F and pre-cool the ambient air drawn from the air inlet 414F. In this way, the temperature of the ambient air entering the water showering compartment 413F will be substantially lowered. This will substantially increase the heat exchange effectiveness and efficiency between the ambient air and the thin film of water flowing in the fill material unit 45F.

It is worth mentioning that the stream of water flowing to the water atomizing units 43F can be driven by a pressure differential (typically in the range of 70 KPa-150 KPa) between the water inlet 13F of the first heat exchanger 10F and the water atomizing units 43F so that no additional energy is needed to atomize the water flowing to the water atomizing units 43F.

When the four-way reversing valve 60F is switched to the heat pump mode, a predetermined amount of refrigerant may be guided to start a heat pump cycle from the compressor 200F. Refrigerant may leave the compressor 200F through the compressor output port 202F and pass through the fourth communicative port 64F and the third communicative port 63F of the four-way reversing valve 60F and enter the second heat exchanger 20F through the fourth connection port 22F. The refrigerant entering the second heat exchanger 20F may perform heat exchange with the air and release heat thereto. The refrigerant may then leave the second heat exchanger 20F through the third connection port 21F and subsequentially enter the first heat exchanger 10F through the second connection port 12F.

In the first heat exchanger 10F, the refrigerant will absorb heat from the water circulating between the first heat exchanger 10F and the heat exchanging arrangement 40F. After absorbing heat, the refrigerant will leave the first heat exchanger 10F through the first connection port 11F, pass through the second communicative port 62F and the first communicative port 61F of the four-way reversing valve 60F, and eventually go back to the compressor 200F through the compressor input port 201F.

When the refrigeration unit of the present invention works as a heat pump, the water in the heat exchanging arrangement 40F absorb (as opposed to release) heat from the ambient air. In this situation, a predetermined amount of anti-freeze agent may be added to the water for preventing a temperature of the water from condensing into ice. Thus, the heat exchanging arrangement 40F further comprises a plurality of additives supply pipes 48F for adding a predetermined amount of anti-freeze agent to the water. In the fourth preferred embodiment, one of the additives supply pipes 48F may extend to the water collection basin 46F while one of the additives supply pipes 48F may extend to near the water input port 31F of the water pump 30F. A predetermined amount of anti-freeze agent may controllably be added to the water through the additives supply pipes 48F. The purpose of the anti-freeze agent is to lower the freezing point of a water in the heat exchanging arrangement 40F.

The heat exchanging arrangement 40F further comprises a control valve 49F provided between the water output port 32F of the water pump 30F and the water atomizing units 43F for selectively controlling a flow of water from the water pump 30F to the water atomizing units 43F. Specifically, when the refrigeration unit operates as a heat pump, the control valve 49F may be turned on to prevent water from flowing to the water atomizing units 43F. In other words, when the refrigeration unit works as heat pump and the temperature of the ambient air is above a predetermined threshold (i.e. the weather is not too cold), the water atomizing units 43F can be deactivated. Water from the water pump 30F may just need to flow to the water showering heads 44F for being sprinkled or showered to the fill material unit 45F. Accordingly, the fan 42F can also be switched off and disabled.

When the temperature of the ambient air falls below a predetermined threshold, the control valve 49F may need to be turned off to allow water from the water pump 30F to reach the water atomizing units 43F again. As in the fourth preferred embodiment, the water reaching the water atomizing units 43F will evaporate at a predetermined rate. At the same time, anti-freeze agent is added to the water for preventing the water from turning into ice. It is worth mentioning that the water passing through the water atomizing units 43F will be atomized in the water atomizing compartment 412F and some of the atomized water will be evaporated in the water atomizing compartment 412F. The partial evaporation of the water may maintain a desirable concentration of the anti-freeze agent in the water and this will ensure that the water will not freeze to a substantial degree. One skilled in the art would appreciate that too much ice or freezing water may damage heat exchangers in air conditioning and heat pump technology. The water atomizing units 43F of the present invention as described above helps to prevent this phenomenon from happening.

It is important to point out that the various alternative configurations of the heat exchanging arrangement 40 as described in the third preferred embodiment may also apply to the heat exchanging arrangement 40F in the fourth preferred embodiment.

The present invention, while illustrated and described in terms of a preferred embodiment and several alternatives, is not limited to the particular description contained in this specification. Additional alternative or equivalent components could also be used to practice the present invention.

What is claimed is:

1. A refrigeration unit, comprising:
a plurality of connecting pipes for allowing heat exchange media to pass therethrough;
a compressor having a compressor input port and a compressor output port;
a first heat exchanger connected to said compressor through at least one of said connecting pipes, said first heat exchanger having a first connection port, a second connection port,
a second heat exchanger connected to said compressor and said first heat exchanger through at least one of said connecting pipes, said second heat exchanger having a third connection port and a fourth connection port;
a heat transfer fan communicated with the second heat exchanger for drawing air to perform heat exchange with said heat exchange medium flowing through said second heat exchanger;
a water pump having a water input port and a water output port, said water output port being connected to a water inlet of said first heat exchanger; and
a heat exchanging arrangement, which comprises:
a main casing having a receiving cavity divided into at least one water atomizing compartment and one water showering compartment, an air inlet communicating with said water atomizing compartment of said receiving cavity, and an air outlet communicating with said water showering compartment of said receiving cavity;
a fan provided in said main casing for drawing ambient air to enter said main casing through said air inlet and exit said main casing through said air outlet;
at least one water atomizing unit provided on said water atomizing compartment and connected to said water output port of said water pump through at least one of said connecting pipes;
at least one water showering head provided on said water showering compartment and connected to said water outlet of said first heat exchanger;
at least one fill material unit provided underneath said water showering head; and
a water collection basin provided underneath said water atomizing unit and said fill material,
wherein a predetermined amount of heated water in said first heat exchanger is arranged to be guided to flow to said water showering head through said water outlet and through at least one of said connecting pipes, said water in said water showering head being sprinkled on said fill material unit and collected in said water collection basin, wherein a predetermined amount of water from said water output port of said water pump is guided to flow to said water atomizing unit through at least one of said connecting pipes, said water flowing to said water atomizing unit being sprayed and atomized in said water atomizing compartment, said ambient air being drawn to sequentially pass through said water atomizing compartment and said water showering compartment to cool down a temperature of said water in said water showering compartment, said water collected in said water collection basin being guided to flow into said water pump through said water input port and at least one of said connecting pipes.

2. The refrigerant unit, as recited in claim 1, further comprising a lubricant oil cooling arrangement which comprises a third heat exchanger having a first water passage port, a second water passage port, a first lubricant passage port, and a second lubricant passage port, said compressor further having a lubricant outlet and a lubricant inlet, said first water passage port connecting to said water outlet of said first heat exchanger, said second water passage port connecting to at least one of said water showering head of said heat exchanging arrangement, said first lubricant passage port connecting to said lubricant outlet of said compressor, said second lubricant passage port connecting to said lubricant inlet of said compressor.

3. The refrigerant unit, as recited in claim 1, further comprising a lubricant oil cooling arrangement and an auxiliary water showering head provided in said water showering compartment, said lubricant oil cooling arrangement comprising a third heat exchanger having a first water passage port, a second water passage port, a first lubricant passage port, and a second lubricant passage port, said compressor further having a lubricant outlet and a lubricant inlet, said first water passage port connecting to said water outlet of said first heat exchanger and said water showering head of said heat exchanging arrangement, said second water passage port connecting to said auxiliary water showering head, said first lubricant passage port connecting to said lubricant outlet of said compressor, said second lubricant passage port connecting to said lubricant inlet of said compressor, said water coming out from said water outlet being bifurcated into two streams, one being directed to said third heat exchanger, the other being directed to said water showering head.

4. The refrigerant unit, as recited in claim 1, further comprising an inverter cooling arrangement, which comprises a compressor inverter having a coolant inlet and a coolant outlet, said inverter cooling arrangement comprising a fourth heat exchanger having a third water passage port, a fourth water passage port, a first coolant passage port, and a second coolant passage port, said third water passage port connecting to said water outlet of said first heat exchanger, said fourth water passage port connecting to said water showering head said first coolant passage port connecting to said coolant outlet of said compressor inverter, said second coolant passage port connecting to said coolant inlet of said compressor inverter.

5. The refrigerant unit, as recited in claim 1, further comprising an auxiliary water showering head provided in said water showering compartment, and an inverter cooling arrangement, which comprises a compressor inverter having a coolant inlet and a coolant outlet, said inverter cooling arrangement comprising a fourth heat exchanger having a third water passage port, a fourth water passage port, a first coolant passage port, and a second coolant passage port, said third water passage port connecting to said water outlet of said first heat exchanger and said water showering head of said heat exchanging arrangement, said fourth water passage port connecting to said auxiliary water showering head, said first coolant passage port connecting to said coolant outlet of said compressor inverter, said second coolant passage port connecting to said coolant inlet of said compressor, water coming out from said water outlet being bifurcated into two streams, one being directed to said fourth heat exchanger, the other being directed to said water showering head.

6. The refrigeration unit, as recited in claim 2, wherein said water output port is connected to said water inlet of said first heat exchanger and said water atomizing unit, so that water exiting from said water pump is bifurcated into two streams, one of said streams being guided to enter said first heat exchanger through said water inlet, another stream of said water being guided to flow to said water atomizing unit, said water reaching said water atomizing unit being arranged to be atomized and released to said water atomizing compartment, said stream of water flowing to said water atomizing unit being driven by a pressure differential between said water inlet of said first heat exchanger and said water atomizing unit so that no additional energy is needed to atomize said water flowing to said water atomizing unit.

7. The refrigeration unit, as recited in claim 3, wherein said water output port is connected to said water inlet of said first heat exchanger and said water atomizing unit, so that water exiting from said water pump is bifurcated into two streams, one of said streams being guided to enter said first heat exchanger through said water inlet, another stream of said water being guided to flow to said water atomizing unit, said water reaching said water atomizing unit being arranged to be atomized and released to said water atomizing compartment, said stream of water flowing to said water atomizing unit being driven by a pressure differential between said water inlet of said first heat exchanger and said water atomizing unit so that no additional energy is needed to atomize said water flowing to said water atomizing unit.

8. The refrigeration unit, as recited in claim 4, wherein said water output port is connected to said water inlet of said first heat exchanger and said water atomizing unit, so that water exiting from said water pump is bifurcated into two streams, one of said streams being guided to enter said first heat exchanger through said water inlet, another stream of said water being guided to flow to said water atomizing unit, said water reaching said water atomizing unit being arranged to be atomized and released to said water atomizing compartment, said stream of water flowing to said water atomizing unit being driven by a pressure differential between said water inlet of said first heat exchanger and said water atomizing unit so that no additional energy is needed to atomize said water flowing to said water atomizing unit.

9. The refrigeration unit, as recited in claim 5, wherein said water output port is connected to said water inlet of said first heat exchanger and said water atomizing unit, so that water exiting from said water pump is bifurcated into two streams, one of said streams being guided to enter said first heat exchanger through said water inlet, another stream of said water being guided to flow to said water atomizing unit, said water reaching said water atomizing unit being arranged to be atomized and released to said water atomizing compartment, said stream of water flowing to said water atomizing unit being driven by a pressure differential between said water inlet of said first heat exchanger and said water atomizing unit so that no additional energy is needed to atomize said water flowing to said water atomizing unit.

10. The refrigeration unit, as recited in claim 2, wherein said heat exchanging arrangement comprises a plurality of water atomizing units connected to said water output port of said water pump, said water atomizing units being arranged to atomize said water supplied to said water atomizing units into droplets, said main casing is configured to having two said water atomizing compartment, said two atomizing compartments being provided adjacent to and on two opposing sides of said water showering compartment respectively so that said water showering compartment is sandwiched between said two water atomizing compartments, said water atomizing units being provided in said two water atomizing compartments respectively and connecting to said water output port of said water pump, said main casing further having one additional air inlet, said two air inlets being provided one two sides of said main casing, so that ambient air is drawn to enter said two water atomizing compartments through said two air inlets respectively, said water collection basin being provided underneath said water atomizing units and said fill material unit in which a transverse direction of said water collection basin extends across said two water atomizing compartments and said water showering compartment.

11. The refrigeration unit, as recited in claim 3, wherein said heat exchanging arrangement comprises a plurality of water atomizing units connected to said water output port of said water pump, said water atomizing units being arranged to atomize said water supplied to said water atomizing units into droplets, said main casing is configured to having two said water atomizing compartment, said two atomizing compartments being provided adjacent to and on two opposing sides of said water showering compartment respectively so that said water showering compartment is sandwiched between said two water atomizing compartments, said water atomizing units being provided in said two water atomizing compartments respectively and connecting to said water output port of said water pump, said main casing further having one additional air inlet, said two air inlets being provided one two sides of said main casing, so that ambient air is drawn to enter said two water atomizing compartments through said two air inlets respectively, said water collection basin being provided underneath said water atomizing units and said fill material unit in which a transverse direction of said water collection basin extends across said two water atomizing compartments and said water showering compartment.

12. The refrigeration unit, as recited in claim 4, wherein said heat exchanging arrangement comprises a plurality of water atomizing units connected to said water output port of said water pump, said water atomizing units being arranged to atomize said water supplied to said water atomizing units into droplets, said main casing is configured to having two said water atomizing compartment, said two atomizing compartments being provided adjacent to and on two opposing sides of said water showering compartment respectively so that said water showering compartment is sandwiched between said two water atomizing compartments, said water atomizing units being provided in said two water atomizing compartments respectively and connecting to said water output port of said water pump, said main casing further having one additional air inlet, said two air inlets being provided one two sides of said main casing, so that ambient air is drawn to enter said two water atomizing compartments through said two air inlets respectively, said water collection basin being provided underneath said water atomizing units and said fill material unit in which a transverse direction of said water collection basin extends across said two water atomizing compartments and said water showering compartment.

13. The refrigeration unit, as recited in claim 5, wherein said heat exchanging arrangement comprises a plurality of water atomizing units connected to said water output port of said water pump, said water atomizing units being arranged to atomize said water supplied to said water atomizing units into droplets, said main casing is further configured to having two said water atomizing compartments, said two atomizing compartments being provided adjacent to and on two opposing sides of said water showering compartment respectively so that said water showering compartment is sandwiched between said two water atomizing compartments, said water atomizing units being provided in said two water atomizing compartments respectively and connecting to said water output port of said water pump, said main casing further having one additional air inlet, said two air inlets being provided one two sides of said main casing, so that ambient air is drawn to enter said two water atomizing compartments through said two air inlets respectively, said water collection basin being provided underneath said water atomizing units and said fill material unit in which a transverse direction of said water collection basin extends across said two water atomizing compartments and said water showering compartment.

14. The refrigeration unit, as recited in claim 2, said main casing is configured to having two said water atomizing compartments and two said water atomizing units, wherein said heat exchanging arrangement further comprises a plurality of water showering heads, said main casing further having two auxiliary water showering compartments formed adjacent to an outer side of said two water atomizing compartments respectively, said heat exchanging arrangement further comprising a plurality of auxiliary fill material units provided in said auxiliary water showering compartments respectively, wherein at least two of said water showering heads are provided above said auxiliary fill material units respectively and connected to said water outlet of said first heat exchanger for sprinkling or showering water on said corresponding auxiliary fill material units, said water collection basin being provided underneath said two water atomizing units, said fill material unit and said auxiliary fill material units in which a transverse direction of said water collection basin extends across a transverse direction of said auxiliary water showering compartments, said two water atomizing compartments and said water showering compartment.

15. The refrigeration unit, as recited in claim 3, said main casing is configured to having two said water atomizing compartments and two said water atomizing units, wherein said heat exchanging arrangement further comprises a plurality of water showering heads, said main casing further having two auxiliary water showering compartments formed adjacent to an outer side of said two water atomizing compartments respectively, said heat exchanging arrangement further comprising a plurality of auxiliary fill material units provided in said auxiliary water showering compartments respectively, wherein at least two of said water showering heads are provided above said auxiliary fill material units respectively and connected to said water outlet of said first heat exchanger for sprinkling or showering water on said corresponding auxiliary fill material units, said water collection basin being provided underneath said two water atomizing units, said fill material unit and said auxiliary fill material units in which a transverse direction of said water collection basin extends across a transverse direction of said auxiliary water showering compartments, said two water atomizing compartments and said water showering compartment.

16. The refrigeration unit, as recited in claim 4, said main casing is configured to having two said water atomizing compartments and two said water atomizing units, wherein said heat exchanging arrangement further comprises a plurality of water showering heads, said main casing further having two auxiliary water showering compartments formed adjacent to an outer side of said two water atomizing compartments respectively, said heat exchanging arrangement further comprising a plurality of auxiliary fill material units provided in said auxiliary water showering compartments respectively, wherein at least two of said water showering heads are provided above said auxiliary fill material units respectively and connected to said water outlet of said first heat exchanger for sprinkling or showering water on said corresponding auxiliary fill material units, said water collection basin being provided underneath said two water atomizing units, said fill material unit and said auxiliary fill material units in which a transverse direction of said water collection basin extends across a transverse direction of said auxiliary water showering compartments, said two water atomizing compartments and said water showering compartment.

17. The refrigeration unit, as recited in claim 5, said main casing is configured to having two said water atomizing compartments and two said water atomizing units, wherein said heat exchanging arrangement further comprises a plurality of water showering heads, said main casing further having two auxiliary water showering compartments formed adjacent to an outer side of said two water atomizing compartments respectively, said heat exchanging arrangement further comprising a plurality of auxiliary fill material units provided in said auxiliary water showering compartments respectively, wherein at least two of said water showering heads are provided above said auxiliary fill material units respectively and connected to said water outlet of said first heat exchanger for sprinkling or showering water on said corresponding auxiliary fill material units, said water collection basin being provided underneath said two water atomizing units, said fill material unit and said auxiliary fill material units in which a transverse direction of said water collection basin extends across a transverse direction of said auxiliary water showering compartments, said two water atomizing compartments and said water showering compartment.

18. A refrigeration unit, comprising:
a plurality of connecting pipes for allowing heat exchange media to pass therethrough;
a compressor having a compressor input port and a compressor output port;
a four-way reversing valve connected to said compressor through said connecting pipes;
a first heat exchanger connected to said compressor through said four-way reversing valve and at least one of said connecting pipes, said first heat exchanger having a first connection port, a second refrigerator port, a water inlet and a water outlet;
a second heat exchanger connected to said compressor and said first heat exchanger through at least one of said connecting pipes, said second heat exchanger having a third connection port and a fourth connection port;
a heat transfer fan communicated with the second heat exchanger for drawing air to perform heat exchange with said heat exchange medium flowing through said second heat exchanger;
a water pump having a water input port and a water output port, said water output port being connected to a water inlet of said first heat exchanger; and
a heat exchanging arrangement, which comprises:
a main casing having a receiving cavity divided into at least one water atomizing compartment and one water showering compartment, an air inlet communicating with said water atomizing compartment of said receiving cavity, and an air outlet communicating with said water showering compartment of said receiving cavity;
a fan provided in said main casing for drawing ambient air to enter said main casing through said air inlet and exit said main casing through said air outlet;
at least one water atomizing unit provided on said water atomizing compartment and connected to said water output port of said water pump through at least one of said connecting pipes;
at least one water showering head provided on said water showering compartment and connected to said water outlet of said first heat exchanger;
at least one fill material unit provided underneath said water showering head; and
a water collection basin provided underneath said water atomizing unit and said fill material,
wherein a predetermined amount of water in said first heat exchanger is arranged to be guided to flow to said water showering head through said water outlet and through at least one of said connecting pipes, said water in said water showering head being sprinkled on said fill material unit and collected in said water collection basin,
wherein a predetermined amount of water from said water output port of said water pump is guided to flow to said water atomizing unit through at least one of said connecting pipes, said water flowing to said water atomizing unit being sprayed and atomized in said water atomizing compartment,
said ambient air being drawn to sequentially pass through said water atomizing compartment and said water showering compartment, said water collected in said water collection basin being guided to flow into said water pump through said water input port and at least one of said connecting pipes.

19. The refrigeration unit, as recited in claim 18, wherein said four-way reversing valve has first through fourth communicative ports and is selectively switched between an air conditioning mode and a heat pump mode, wherein in said air conditioning mode, said first communicative port is connected to said third communicative port, while said second communicative port is connected to said fourth communicative port, wherein in said heat pump mode, said four-way reversing valve is switched so that said first communicative port is connected to second communicative port while said third communicative port is connected to said fourth communicative port.

20. The refrigeration unit, as recited in claim 19, wherein said compressor input port is connected to said first communicative port of said four-way reversing valve through at least one of said connecting pipes, said compressor output port being connected to said fourth communicative port of said four-way reversing valve through at least one of said connecting pipes.

21. The refrigeration unit, as recited in claim 20, wherein said first connection port of said first heat exchanger is connected to said second communicative port of said four-way reversing valve through at least one of said connecting pipes, said fourth connection port of said second heat exchanger being connected to said third communicative port of said four-way reversing valve through at least one of said connecting pipes, said second connection port of said first heat exchanger being connected to said third connection port of said second heat exchanger through at least one of said connecting pipes.

22. The refrigeration unit, as recited in claim 21, wherein said water output port is connected to said water inlet of said first heat exchanger and said water atomizing unit, so that water exiting from said water pump is bifurcated into two streams, one of said streams being guided to enter said first heat exchanger through said water inlet, another stream of said water being guided to flow to said water atomizing unit, said water reaching said water atomizing unit being arranged to be atomized and released to said water atomizing compartment, said stream of water flowing to said water atomizing unit being driven by a pressure differential between said water inlet of said first heat exchanger and said water atomizing unit so that no additional energy is needed to atomize said water flowing to said water atomizing unit.

23. The refrigeration unit, as recited in claim 22, wherein said heat exchanging arrangement further comprises a plurality of additives supply pipes extended to said water collection basin and said water input port of said water pump so as to allow a predetermined amount of anti-freeze agent to be added to said water circulating in said heat exchanging arrangement.

24. The refrigeration unit, as recited in claim 23, wherein said heat exchanging arrangement further comprises a control valve provided between said water output port of said water pump and said water atomizing units for selectively controlling a flow of water from said water pump to said water atomizing units, in such a manner that when said four-way reversing valve is switched to said heat pump mode and a temperature of said ambient air is above a predetermined threshold, said control valve is arranged to stop water flowing from said water pump to said water atomizing units, wherein when said four-way reversing valve is switched to said heat pump mode and a temperature of said ambient air is equal to or below said predetermined threshold, said control valve is arranged to allow water to flow from said water pump and reach said water atomizing units, said water reaching said water atomizing units being arranged to at least partially evaporate so as to maintain a predetermined concentration of said anti-freeze agent in said water circulating in said heat exchanging arrangement.

\* \* \* \* \*